United States Patent [19]
Asakura

[11] Patent Number: 4,739,488
[45] Date of Patent: Apr. 19, 1988

[54] MACHINE TOOL WITH TOOL SELECTION AND WORK SEQUENCE DETERMINATION

[75] Inventor: Koichi Asakura, Aichi, Japan

[73] Assignee: Brother Kogyo Kabushiki Kaisha, Nagoya, Japan

[21] Appl. No.: 777,729

[22] Filed: Sep. 19, 1985

[30] Foreign Application Priority Data

Sep. 21, 1984 [JP] Japan .............................. 59-198791
Sep. 21, 1984 [JP] Japan .............................. 59-198792
Oct. 2, 1984 [JP] Japan .............................. 59-206883
Oct. 15, 1984 [JP] Japan .............................. 59-215672

[51] Int. Cl.$^4$ .................... G06F 15/46; G05B 19/18
[52] U.S. Cl. .................................. 364/474; 364/171; 29/568
[58] Field of Search ............. 364/474, 475, 167–171, 364/191–193; 318/568; 29/568

[56] References Cited

U.S. PATENT DOCUMENTS 4,033,206 7/1977 Morita et al. ................... 364/474 X
4,445,182 4/1984 Morita et al. ....................... 364/474
4,530,046 7/1985 Munekata et al. ............... 364/474 X
4,547,854 10/1985 Hashimoto et al. ................ 364/474
4,549,270 10/1985 Fukumura et al. ................. 364/474

Primary Examiner—Joseph Ruggiero
Attorney, Agent, or Firm—Finnegan, Henderson, Farabow, Garrett and Dunner

[57] ABSTRACT

A machine tool includes a plurality of storage means for storing preworking steps, tool information, and a working program for a large variety of working operations to be performed or workpieces of various shapes and materials. An operation control means determines from an operator the shape and material of a workpiece to be machined and then accesses the stored information to identify the tools necessary, the sequence of tool use, and the specific working operations to be performed to accomplish the desired machining.

15 Claims, 41 Drawing Sheets

FIG. 3

TOOL TABLE (STORAGE CONTENTS OF TOOL INFORMATION)

| TOOL NUMBER | | 01 | 02 | 03 | 04 | 05 | 06 |
|---|---|---|---|---|---|---|---|
| TOOL | | DRILL | DRILL | CENTER HOLE DRILL | CHAMFERING TOOL | TAP | COUNTERSUNK DRILL |
| REQUIRED DIMENSION | POINT・ANGLE | $\alpha=118$ | $\alpha=118$ | $\alpha=120$ | | | $\alpha=118$ |
| | SMALL DIAMETER | | | $\phi d=1.5$ | $\phi d=3.0$ | | $\phi d=5$ |
| | SMALL DIAMETER PORTION LENGTH | | | $\ell=2.5$ | | | $\ell_1=20$ |
| | CENTER ANGLE | | | $\theta=60$ | $\theta=90$ | | |
| | CHAMFER LENGTH | | | | | $L=6$ | |
| | DIAMETER・NOMINAL SIZE | $\phi D=2.9$ | $\phi D=5.0$ | $\phi D=4$ | $\phi D=10$ | 6 | $\phi D=8.5$ |
| | PITCH・NUMBER OF THREADS | | | | | 1 | |
| | FLUTE LENGTH | $\ell=40$ | $\ell=50$ | | | $\ell=30$ | $\ell=40$ |
| | DIRECTION OF THREAD | | | | | RIGHT | |
| | NUMBER OF TOOTH | | | | | | |
| TOOL LENGTH | | $\ell_4=165$ | $\ell_4=180$ | $\ell_4=110$ | $\ell_4=110$ | $\ell_4=150$ | $\ell_4=150$ |
| REMAINED TIME FOR USE (MINUTE) | | 200 | 300 | 200 | 120 | 180 | 300 |

FIG. 5

TOOL PATTERN TABLE

| | REQUIRING CHAMFERING | WITHOUT CHAMFERING |
|---|---|---|
| CENTER HOLE | 1. CENTER HOLE DRILL | 1. CENTER HOLE DRILL |
| BORING | 1. CENTER HOLE DRILL<br>2. CHAMFERING DRILL | 1. CENTER HOLE DRILL<br>2. DRILL |
| TAP | 1. CENTER HOLE DRILL<br>2. DRILL<br>3. CHAMFERING TOOL<br>4. TAP | 1. CENTER HOLE DRILL<br>2. DRILL<br>3. TAP<br>4. ✶ |
| COUNTERSUNK-BORE | 1. CENTER HOLE DRILL<br>2. COUNTERSUNK DRILL<br>3. CHAMFERING TOOL | 1. CENTER HOLE DRILL<br>2. COUNTERSUNK DRILL<br>3. ✶ |
| COUNTERSUNK TAP | 1. CENTER HOLE DRILL<br>2. DRILL<br>3. END MILL<br>4. CHAMFERING TOOL<br>5. TAP | 1. CENTER HOLE DRILL<br>2. DRILL<br>3. END MILL<br>4. TAP<br>5. ✶ |
| TOP FACE MILLING | 1. END MILL | 1. END MILL |
| REAMER | 1. CENTER HOLE DRILL<br>2. DRILL<br>3. CHAMFERING TOOL<br>4. END MILL<br>5. REAMER | 1. CENTER HOLE DRILL<br>2. DRILL REAMER<br>3. ✶<br>4. ✶<br>5. ✶ |
| COUNTERSUNK REAMER | 1. CENTER HOLE DRILL<br>2. DRILL<br>3. COUNTERSUNK TOOL<br>4. CHAMFERING TOOL<br>5. END MILL<br>6. REAMER | 1. CENTER HOLE DRILL<br>2. DRILL<br>3. COUNTERSUNK TOOL<br>4. END MILL<br>5. REAMER<br>6. ✶ |

FIG. 6

TAPPING PREPARED-HOLE DRILL DIAMETER

| METRIC COARSE SCREW THREAD ||
|---|---|
| NOMINAL SIZE , PITCH | DRILL DIAMETER |
| M2 x 0.4 | 1.6 |
| 2.2 x 0.45 | 1.7 |
| 2.5 x 0.45 | 2.0 |
| 3 x 0.5 | 2.5 |
| 3.5 x 0.6 | 2.9 |
| 4 x 0.7 | 3.3 |
| 4.5 x 0.75 | 3.8 |
| 5 x 0.8 | 4.2 |
| 6 x 1.0 | 5.0 |
| 7 x 1.0 | 6.0 |
| 8 x 1.25 | 6.8 |
| 9 x 1.25 | 7.8 |
| 10 x 1.5 | 8.5 |

FIG. 15

WORKING PROGRAM TABLE

| | |
|---|---|
| WORKING ORIGIN | X100    Y100 |
| WORK NUMBER | 1 |
| WORK MATERIAL | S45C |
| | |
| STEP NUMBER | 01 |
| WORKING METHOD | TAP |
| NOMINAL SIZE | 6 |
| PITCH | 1 |
| CHAMFERING | YES |
| END OF Z-SHAFT | THROUGH HOLE |
| LOW HOLE DEPTH | 30 |
| WORKING DEPTH | 25 |
| WORK HEIGHT | 40 |
| RETURN HEIGHT | 45 |
| | |
| X Y POSITION | X=20    Y=20 |
| | |
| STEP NUMBER | 02 |
| WORKING PROCESS | COUNTERSUNK BORE |
| HOLE DIAMETER | 5 |
| SPOT DIAMETER | 8.5 |
| | |
| CHAMFERING | NO |
| | |
| END OF Z-SHAFT | THROUGH HOLE |
| | |
| WORKING DEPTH | 25 |
| | |
| WORK HEIGHT | 40 |
| RETURN HEIGHT | 45 |
| | |
| SPOT DEPTH | 10 |
| | |
| X Y POSITION | X=60    Y=35 |
| | |
| PROGRAM END | |

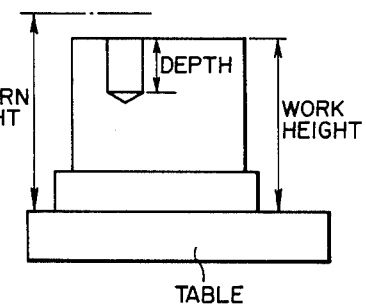

FIG. 18

\<PROGRAM    1 φ φ φ \>
• WORKING ORIGIN  ×  ■ ← WINK

WORKING DATA  19

```
<PROGRAM   1 φφφ>
• WORKING ORIGIN   ■X   100        ■Y   100    WORKING DATA
• WORK NUMBER  1
• WORK MATERIAL  S45C
■STEP  φ1  TAP
↑
WINK

KIND OF SCREW ==> 1

1   METRIC COARSE SCREW THREAD
2   METRIC FINE SCREW THREAD
3   UNIFIED COARSE THREAD
4   UNIFIED FINE THREAD
5   SEWING MACHINE THREAD
```

CUTTING CONDITION TABLE

(S45C)

| KIND OF WORKING | TOOL | | PERIFERAL SPEED m/MIN | FEED RATE mm/REVOLUTION |
|---|---|---|---|---|
| CENTER HOLE DRILL | CENTER HOLE DRILL 1 | | 10.0 | 0.05 |
| DRILL | DRILL 1 | | 12.0 | 0.1 |
| TAP | SPIRAL TAP 2 | BLIND HOLE | 8.0 | * |
| | POINT TAP 2 | THROUGH HOLE | 8.0 | * |
| CHAMFERING TOOL | CHAMFERING TOOL 1 | HOLE | 8.0 | 0.08 |
| CHAMFERING DRILL | CHAMFERING DRILL 1 | HOLE | 12.0 | 0.15 |
| | | CHAMFERING | 8.0 | 0.1 |
| COUNTERSUNK DRILL | COUNTERSUNK DRILL 1 | HOLE | 8.0 | 0.1 |
| | | COUNTERSUNK | | |
| COUNTERSUNK TOOL | COUNTERSUNK TOOL 1 | | 8.0 | 0.1 |
| DRILL TAP | DRILL TAP 1 | HOLE | 10.0 | 0.1 |
| | | TAP | 8.0 | * |
| END MILL | END MILL 3 | Z-DIRECTION | 12.0 | 0.2 |
| | | TRANSVERSE DIRECTION | 12.0 | 0.2 |
| REAMER | REAMER 5 | | 6.0 | 0.8 |
| DRILL REAMER | DRILL REAMER 1 | HOLE | 12.0 | 0.15 |
| | | REAMER | 6.0 | 0.8 |

FIG. 27

| WORKING PROGRAM | | |
|---|---|---|
| WORKING ORIGIN | X100 | Y100 |
| WORK NUMBER | 1 | |
| MATERIAL | S45C | |
| | | |
| STEP NUMBER | 01 | |
| WORKING MANNER | DRILL | |
| HOLE DIAMETER | 2.9 | |
| X Y DIRECTION | X20 | Y30 |
| | | |
| STEP NUMBER | 02 | |
| WORKING MANNER | DRILL | |
| HOLE DIAMETER | 2.9 | |
| X Y DIRECTION | X40 | Y30 |
| | | |
| STEP NUMBER | 03 | |
| WORKING MANNER | DRILL | |
| HOLE DIAMETER | 2.9 | |
| X Y DIRECTION | X60 | Y30 |
| | | |
| STEP NUMBER | 04 | |
| WORKING MANNER | DRILL | |
| HOLE DIAMETER | 5.0 | |
| X Y DIRECTION | X85 | Y30 |
| | | |
| STEP NUMBER | 05 | |
| WORKING MANNER | TAP | |
| NOMINAL SIZE | M6 | |
| PITCH | 1 | |
| X Y DIRECTION | X85 | Y30 |
| PROGRAM | END | |

FIG. 33

| TOOL | OFFSET | REST FOR USE |
|---|---|---|

1 φ φ φ
2
3
4
5 ■ ←WINK
6
7
8
9
10

TOOL NUMBER ==>  4a

PROGRAM NUMBER

1  φ 3  CENTER HOLE DRILL      5      CENTER HOLE DRILL
2  φ 2  DRILL            5.0   6  φ 6  COUNTERSUNK DRILL  8.5
3  φ 4  CHAMFERING TOOL  3.0   7
4  φ 5  TAP              M6    8
                               9
                               1 φ

FIG. 36  TOOL TABLE (STORAGE CONTENTS OF TOOL INFORMATION MEMORY)

| TOOL NUMBER | | 01 | 02 | 03 | 04 | 05 | 06 | 07 |
|---|---|---|---|---|---|---|---|---|
| TOOL | | DRILL | DRILL | CENTER HOLE DRILL | CHAMFERING TOOL | TAP | COUNTERSUNK DRILL | REAMER |
| REQUIRED DIMENSION | POINT ANGLE | $\alpha=118$ | $\alpha=118$ | $\alpha=120$ | | | $\alpha=118$ | |
| | SMALL DIAMETER | | | $\phi d=1.5$ | $\phi d=3.0$ | | $\phi d=5$ | |
| | SMALL DIAMETER LENGTH | | | $\ell=2.5$ | | | $\ell_1=20$ | |
| | CENTER ANGLE | | | $\theta=60$ | $\theta=90$ | | | |
| | CHAMFERING LENGTH | | | | | $L=6$ | | $L=4$ |
| | OUTER DIAMETER · NOMINAL DESIGNATION | $\phi D=2.9$ | $\phi D=5.0$ | $\phi D=4$ | $\phi D=10$ | 6 | $\phi D=8.5$ | $\phi D=6$ |
| | PITCH · THE NUMBER OF THREAD | | | | | — | | |
| | FLUTE LENGTH | $\ell=40$ | $\ell=50$ | | | $\ell=30$ | $\ell=40$ | $\ell=5$ |
| | DIRECTION OF THREAD | | | | | RIGHT | | |
| | THE NUMBER OF TOOTH | | | | | | | |
| TOOL LENGTH | | $\ell_4=165$ | $\ell_4=180$ | $\ell_4=110$ | $\ell_4=110$ | $\ell_4=150$ | $\ell_4=150$ | $\ell_4=150$ |
| REMAINED TIME FOR USE (MINUTE) | | 200 | 300 | 200 | 120 | 180 | 300 | 300 |

FIG. 38

WORKING PROGRAM TABLE

| | |
|---|---|
| PROGRAM No | 1000 |
| WORKING ORIGIN | X100    Y100 |
| WORK NUMBER | 1 |
| WORK MATERIAL | S45C |
| | |
| STEP NUMBER | 01 |
| WORKING MANNER | TAP |
| NOMINAL SIZE | 6 |
| PITCH | 1 |
| | |
| CHAMFERING | YES |
| END OF Z-SHAFT | BLIND HOLE |
| | |
| WORKING DEPTH | 20 |
| WORK HEIGHT | 80 |
| RETURN HEIGHT | 85 |
| | |
| X Y POSITION | X=20    Y=20 |
| | |
| STEP NUMBER | 02 |
| WORKING MANNER | REAMER |
| HOLE DIAMETER | 6 |
| | |
| CHAMFERING | NO |
| | |
| END OF Z-SHAFT | BLIND HOLE |
| | |
| WORKING DEPTH | 30 |
| | |
| WORK HEIGHT | 80 |
| RETURN HEIGHT | 85 |
| | |
| X Y POSITION | X=60    Y=35 |
| | |
| PROGRAM END | |

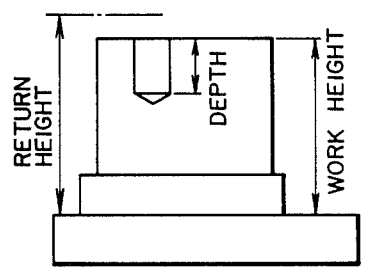

FIG. 40

```
         TOOL           OFFSET        REST FOR USE

1   •
 2   •
 3   •
 4   •
 5   ■ ←WINK
 6   •
 7   •
 8   •
 9   •
10   •

TOOL NUMBER ==>  ┐19a

PROGRAM NUMBER
1000
  1   03  CENTER HOLE DRILL        5   CENTER HOLE DRILL
  2   02  DRILL           5.0      6   06  COUNTERSUNK DRILL 8.5
  3   04  CHAMFERING TOOL 3.0      7
  4   05  TAP             M6       8
                                   9
                                  10
```

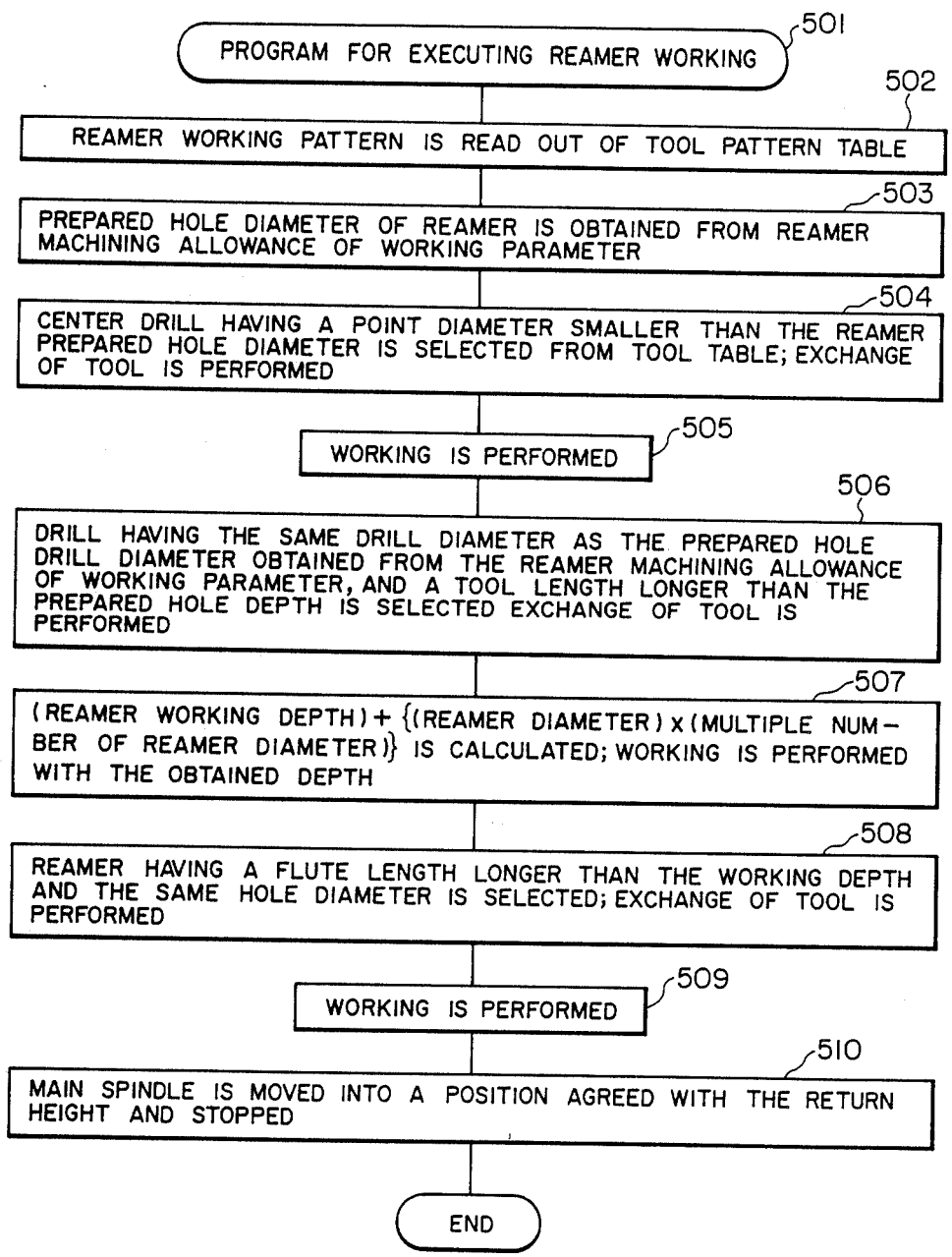

MACHINE TOOL WITH TOOL SELECTION AND WORK SEQUENCE DETERMINATION

BACKGROUND OF THE INVENTION

1. Field of the Invention

The present invention relates to a machine tool having a number of tools for successively performing a plurality of different kinds of operations under the control of a computer.

2. Description of the Prior Art

Conventionally, when a working program for a numerically controlled machine tool was written all of the process data including the types of tools to be used, the sequence of operations to be performed in the preworking and final working steps, and the working dimensions, etc., obtained by analyzing the preworking steps from a planning drawing had to be entered into a computer in order to determine the tools necessary from the initial preworking step to the final working step. The selection of tools was made on the basis of the kind and shape of the final working operations shown in the planning drawing. Thus, it was very troublesome and time-consuming to enter the working program into a computer.

Further, in a conventional numerically controlled machine tool, cutting conditions had to be entered for every kind of operation in order to enter a working program into a numerical control device. This was necessary after reading out a preworking step and a final working step from a final working shape shown in a planning drawing and after determining the kind of operation required for each working step. Thus, a large volume of complicated data on cutting conditions was required and had to be entered repeatedly. Thus, not only has the entering operation of the cutting conditions been troublesome but also there has been a risk of misentering the data.

Japanese Patent Unexamined Publication No. 46408/1983 discloses a method in which working programs are set corresponding to working shapes of a workpiece. This enables cutting conditions stored in advance corresponding to numerical values of the respective working shapes to be read out to perform operations on the workpiece on the basis of the read-out cutting conditions. Since the working shapes of a workpiece vary extremely in kind, in practice it is not possible to store in advance the cutting conditions corresponding to the numerical values of all of the working shapes.

Furthermore, in a conventional machine tool provided with an automatic tool changing device, it has been necessary to preselect the tools that would be used through the working steps from the beginning step to the final working step as shown in the planning drawings. These preselected tools were mounted in a tool magazine, the positions of the tools within the magazine were determined, and the mounted positions of the tools in the tool magazine were entered into the control computer for every step in the working program. Thus, it has been necessary to consider the working, tools and the mounted positions thereof when making a working program. This further made the generating of the working program troublesome and it was difficult to determine in advance the kinds and shapes of the tools needed for all the working steps and to mount all the tools properly in a tool magazine, this further increased the risk of making errors.

Moreover, conventionally, in making a working program for a numerically controlled machine tool, in the case where final working (second working) illustrated in a planning drawing required hole preparation, e.g., tap working or reamer working, or the like, a programmer had to determine the depth of a hole to be made by first working operation. This included consideration of tool diameter, pitch, and the like, so as to enter the depth of the prepared hole in the working program every time the program was made. This contributed to the difficulty of developing the working program.

SUMMARY OF THE INVENTION

An object of the present invention is to eliminate the disadvantages in the prior art as described above.

Another object of the present invention is a machine tool in which a preworking step is determined by entering only the kind and shape of final working and each working operation can be performed while selecting tools necessary for the working step.

A further object of the present invention is a machine tool in which cutting conditions can be easily stored, and in which it is not necessary to enter the cutting conditions every time each step of a working program is executed.

Still a further object of the present invention is a machine tool in which tools to be used in a working program are automatically selected and displayed by entering working positions and shapes as a working program.

Still another object of the present invention is a machine tool in which the depth of a prepared hole to be formed by first working operations is automatically determined only by entering the working depth of second working operations illustrated in a drawing.

These and other objects are achieved by a machine tool having a plurality of tools for successively performing a plurality of kinds of working operations comprising tool information memory means for storing information corresponding to each of the plurality of tools, working program memory means for storing a working program including working information with respect to final working operations for each working step of the plurality of kinds of working operations, preworking step memory means for storing one or more preworking steps corresponding to each of the final working operations, and operation means for accessing the tool information memory means, the working program memory means, and the preworking step memory means for executing the working program to select the preworking step corresponding to tool working step of the working operations and for identifying the tools necessary for performing each of the working steps and corresponding preworking steps.

BRIEF DESCRIPTION OF THE DRAWINGS

The manner in which the above objects and other objects, features and advantages of the present invention are achieved will became fully apparent from the following detailed description when it is considered in view of the drawings, wherein:

FIG. 3 is a tool table showing the contents of the storage of tool information;

FIG. 5 is a tool pattern table showing a first kind of stored data corresponding to a preworking step;

FIG. 6 is a drill diameter table for tapping prepared holes and illustrates a second kind of stored data corresponding to a preworking step;

FIG. 15 is a working program table showing the contents of a working program;

FIGS. 16 to 22 are front views of a computer screen at different points of entering the working program;

FIG. 25 is a cutting condition table showing the stored contents of the cutting condition memory shown in FIG. 24;

FIG. 27 is a chart showing a working program entered into the working program memory shown in FIG. 24;

FIG. 33 is a front view of a CRT screen displaying tools for use in working;

FIG. 36 is a tool table showing the stored contents of a tool information memory;

FIG. 38 is a working program table showing the instructions in a working program of the embodiment of FIG. 35;

FIG. 40 is a front view of a CRT screen displaying tools for use in working operations;

FIG. 42 is a flowchart showing the execution of reamer working.

DETAILED DESCRIPTION OF THE PREFERRED EMBODIMENTS

Figure 1:
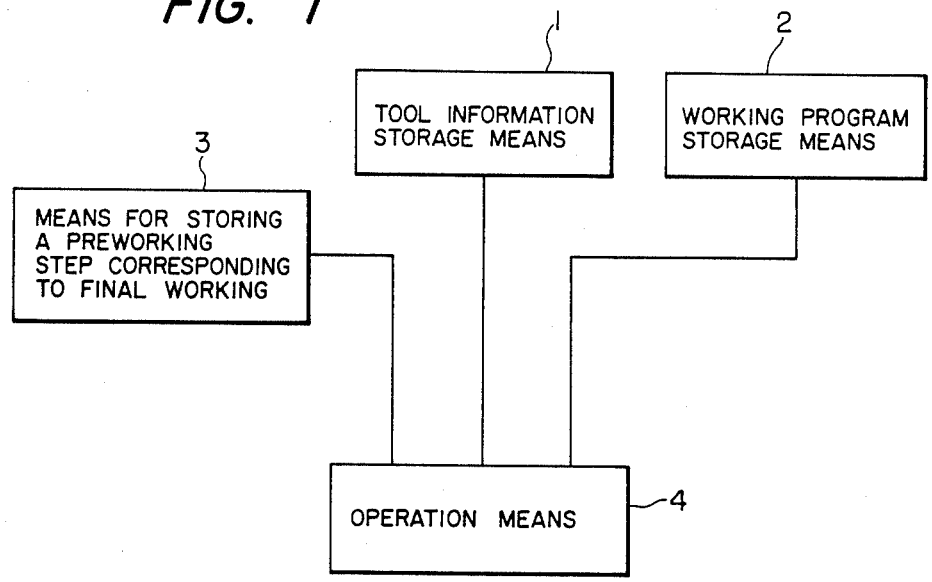
FIG. 1 is a block diagram showing a basic arrangement of an embodiment according to the present invention.

According to an aspect of the present invention, as shown in FIG. 1, a machine tool having a number of tools for successively performing a plurality of kinds of working operations comprises tool information storage means 1 for storing information in connection with the numbers of tools, working program storage means 2 for storing a working program having working operation information with respect to final working operations for every step of the plurality of kinds of working operations, preworking step storage means 3 for storing a preworking step corresponding to the final working operation, and operation means 4 for reading out the preworking step necessary for the final working for every step of the working program in accordance with the working program in the working program storage means 2 and for selecting a tool necessary for each working step among tools in the contents of the tool information storage means 1.

In the foregoing arrangement, merely by reading out the final working step and shape illustrated in the drawing and entering that data into the working program storage means 2, the operation means 4 operates such that the tool information and the preworking step are read out of the tool information storage means 1 and the preworking step storage means 3, respectively, the preworking operations are determined, the necessary tools are selected, and each working step is performed. Thus, the entry of the working program becomes remarkably easy.

Figure 23:
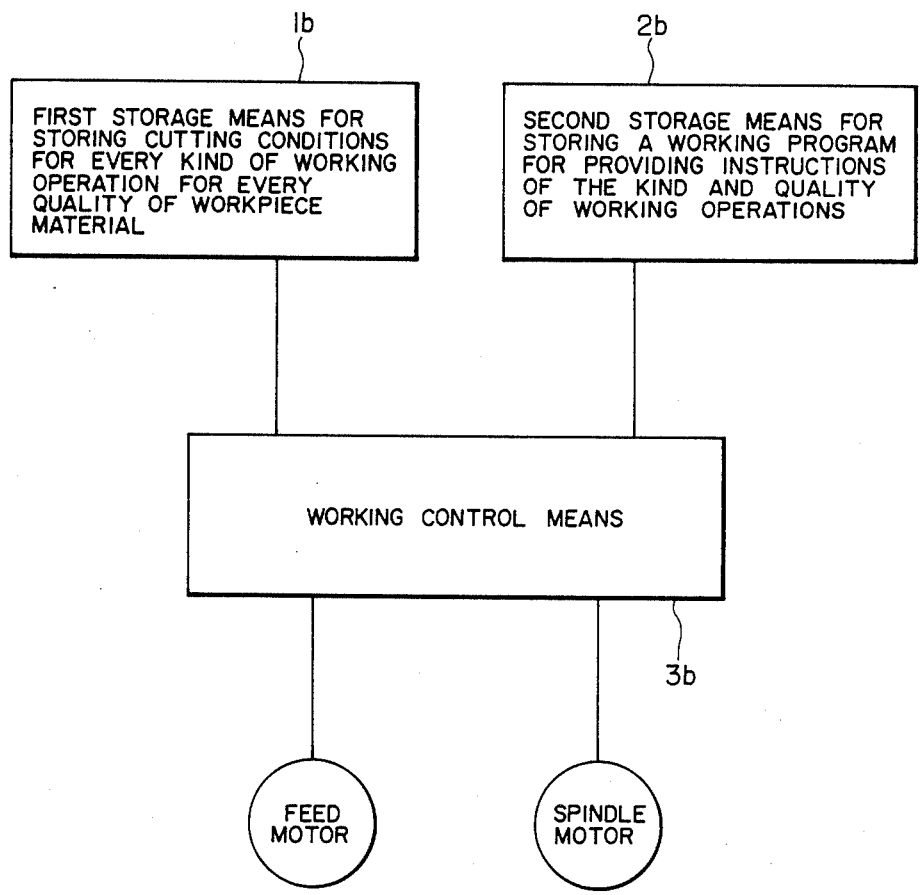
FIG. 23 is a block diagram showing the basic arrangement of a second embodiment of a machine tool according to the present invention.

According to another aspect of the present invention, as shown in FIG. 23, the machine tool comprises first storage means 1b for storing cutting conditions for every kind of working operation for every quality workpiece material, second storage means 2b for storing a working program for providing instructions of the kind and quality of working operations, and working control means 3b for controlling working operations by reading the cutting conditions out of the first storage means 1b in accordance with the kind and quality of the working operations on the basis of the working program stored in the second storage means 2b.

In the arrangement as described above according to the present invention, cutting conditions corresponding to the quality of a workpiece material are stored in advance in the first storage means 1b so that the storing of the cutting conditions is remarkably easy because the quality of a workpiece material is finite and usually limited to several types. Further, according to the present invention, a working program for providing instructions of the quality of material of a workpiece material is stored in the second storage means 2b, so that it is not necessary to enter the cutting conditions for every kind of each working operation into a working program when the working program is entered, and therefore the entering of a working program becomes easy. The working control means 3b automatically controls the performance of desired working operations by reading out the cutting conditions and the working program which are related to each other by the quality of the workpiece material.

Figure 30:
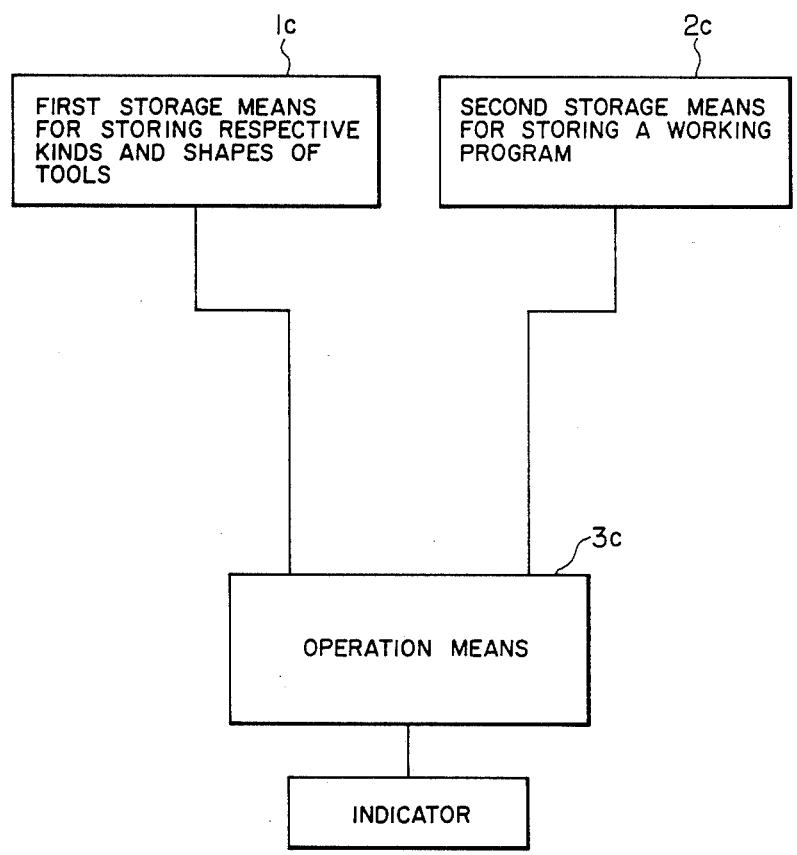
FIG. 30 is a block diagram showing a basic arrangement of a third embodiment of the present invention.

According to a further aspect of the present invention, as shown in FIG. 30, the machine tool comprises first storage means 1c for storing respective kinds and shapes of numbers of tools which are larger in number than a predetermined number of tools, second storage means 2c for storing a working program for instructing positions and shapes of working operations successively in the order of working steps, and operation means 3c for selecting and displaying tools to be used in the working program out of the tools stored in the first storage means 1c.

In the arrangement as described above, if a working program is stored in the second storage means 2c, the operation means 3c operates to select tools to be used in the working program among the tools stored in the first storage means 1a and to display the tools so that the machine operator can perform the working operations according to the order of working steps merely by mounting the displayed tools in a tool magazine. Therefore, the selection and mounting of tools is made easy, the mounting can be performed correctly, and the working program can be performed simply.

According to a further aspect of the present invention, the machine tool for performing first working operations for boring working by means of a tap or a reamer and second working operations to tap or ream the hole formed in the first working operations, comprises setting means for setting a difference in working depth between the first and second working operations, so that the second working depth is made deeper than the first working depth.

In the arrangement as described above, if the operator enters the depth of the final working operation (second working operation) shown in a planning drawing, as a working program, the depth of the hole prepared by the first working will be deeper than the depth of the tapping or reaming in the second working operation in accordance with the difference value set by the setting means for setting a difference in working depth between the first and the second working operations. Accordingly, the second working operation can be performed properly without requiring entry of the depth of a prepared hole every time a working program is executed.

According to a first preferred embodiment of this invention in the case where the second working operation is reaming or the like and requires assignment of a tool diameter (finished diameter), the setting means may set a multiple of the tool diameter for the second working operation. In this manner, a product, between the multiple set by the setting means and the tool diameter for the second working operation is obtained and the depth of the hole prepared in the first working operation is deeper than the depth of the second working operation as determined by the product value. Thus, there is an advantage that if the second working operation is reaming or the like it can be performed properly without entering the working depth in making a working program.

According to a second preferred embodiment of this invention, in the case where the second working operation is tapping, the number of threads of a tap to be used for performing the second working operation is set by the setting means and the product of the number of threads set by the setting means and the pitch of the tapping tool in the second working operation is obtained. The depth of the hole in the first working operation is made deeper than the depth achieved by the second working operation by the value of the product. This is because the depth of the prepared hole must be made deeper when tapping with a large pitch, that is, with a large diameter. Thus, there is an advantage that the second working operation, that is tapping, can be properly performed and the step of entering the depth of hole can be eliminated in making a working program.

Figure 2:
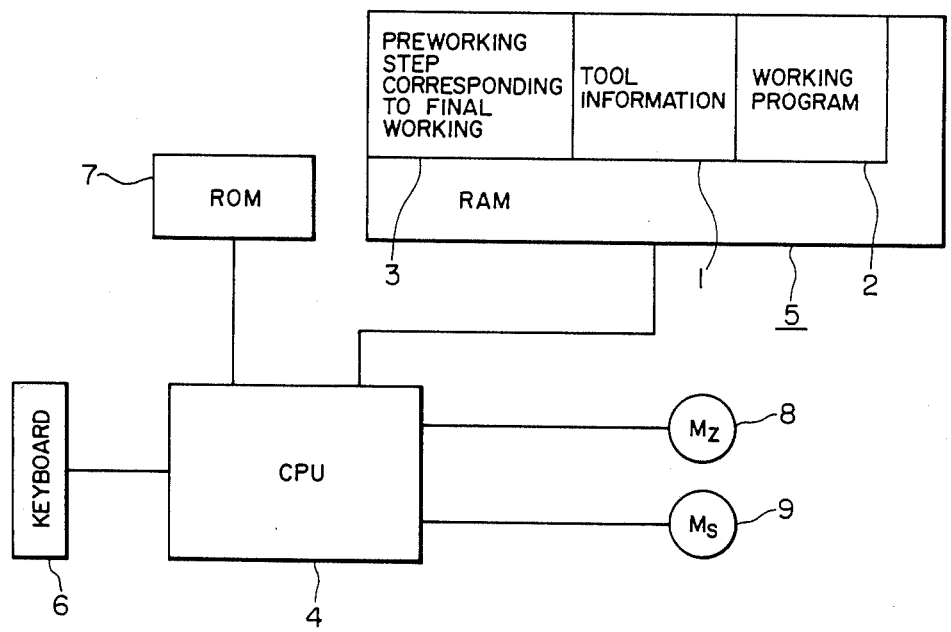
FIG. 2 is a block diagram showing the arrangement of the machine tool of the embodiment of FIG. 1.
Figure 4D:
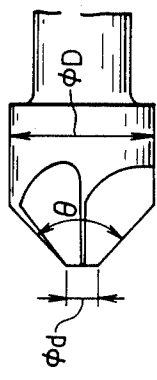
FIGS. 4a to 4f are front views each showing dimensions required in tool registration for various kinds of tools.
Figure 4E:
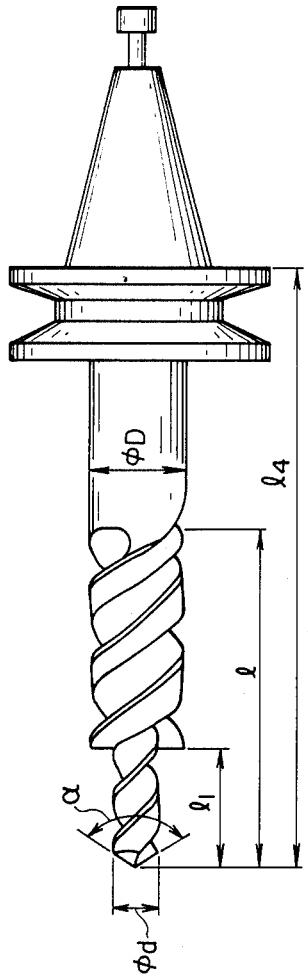
Figure 4F:
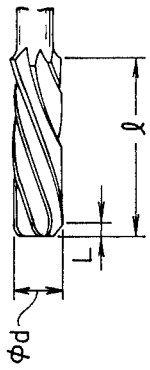
Figure 4A:
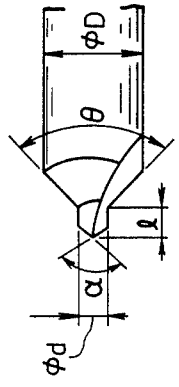
Figure 4B:
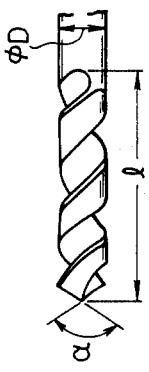
Figure 4C:
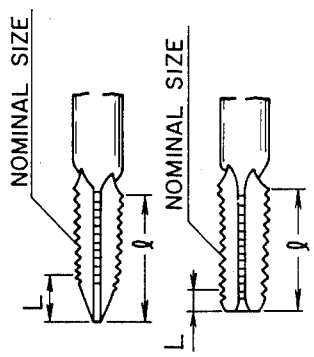

FIG. 2 is a block diagram showing the arrangement of a machine tool according to the first embodiment of the present invention. In the drawing, there is provided a random access memory RAM 5 for storing tool information 1, a working program 2, preworking steps 3 corresponding to final working operations, and the like. The stored contents of the tool information 1 contain, for example, a tool name, required dimensions, tool length, and residual using time (minute), for each of the tool numbers 01 to 06 as shown in a tool table of FIG. 3.

The dimensions required at the time of registration of various tools, such as a drill, a center drill, a chamfering tool, a tap, a countersunk drill, etc., in the tool table of FIG. 3 may include, as written in FIG. 3 with respect to the various tools, a point angle $\alpha$, a drill diameter $\phi D$, and the flute length l in the case of a drill; a small diameter $\phi d$ and a small diameter portion length $l_1$ in the case of a countersunk drill; and a center angle $\theta$ in addition to the required dimensions as described above in the case of a center drill. The tool table may include the following data for a tap, a chamfer length L, a diameter, a nominal size, a pitch, the number of threads, a flute length l, and the direction of the thread as may be required at the time of tool registration. For a chamfering tool, a small diameter $\phi d$, a center angle $\theta$, and a diameter $\phi D$ may be the dimensions required at the time of tool registration. Those dimensions required at the time of tool registration are illustrated in FIGS. 4(a) to 4(f) for the respective tools, that is, a center drill, a drill, a tap, a chamfering tool, a countersunk drill, and a reamer.

As a first kind of stored data for a preworking step 3, for example, tool patterns necessary for various kinds of working operations, such as center hole working, bore working, tap working, countersunk-bore working, countersunk tap working, tap face milling, reamer working, and countersunk reamer working, are registered for each of the cases of "requiring chamfering" and "without requiring chamfering", as shown in a tool pattern table of FIG. 5. As a second kind of stored data for a preworking step 3, for example relating to the formation of a metric coarse screw thread, prepared hole drill diameters are registered in accordance with the nominal size, and the pitch in the final working step may be registered in a table such as a tapping prepared-hole drill diameter table of FIG. 6.

The editing of the working program 2 is performed by operating a keyboard 6 as shown in FIG. 2 through a step of entering drawing data such as tool diameters (hole diameters) or the like, a step of selecting the working order, a step of changing tool patterns, a step of assigning and changing tools, a step of changing cutting conditions, a step of displaying, deleting, and aligning portions of a program and a memory, and an input/output step with an external program storage device, etc.

In FIG. 2, a central processing unit (CPU) 4 functions as operation means and a read only memory (ROM) 7 stores instructions for controlling the exchange of working tools so as to feed them one by one. The CPU 4 is controlled in accordance with the working program 2 stored in the ROM 7 to read the stored contents as to the tool information 1 and the preworking step 3 corresponding to the final working step and to perform an operation for performing each preworking and final working operation. A feed motor 8 for feeding a tool and a spindle motor 9 for rotating a tool at a desired rotational speed are also provided.

Figure 7:
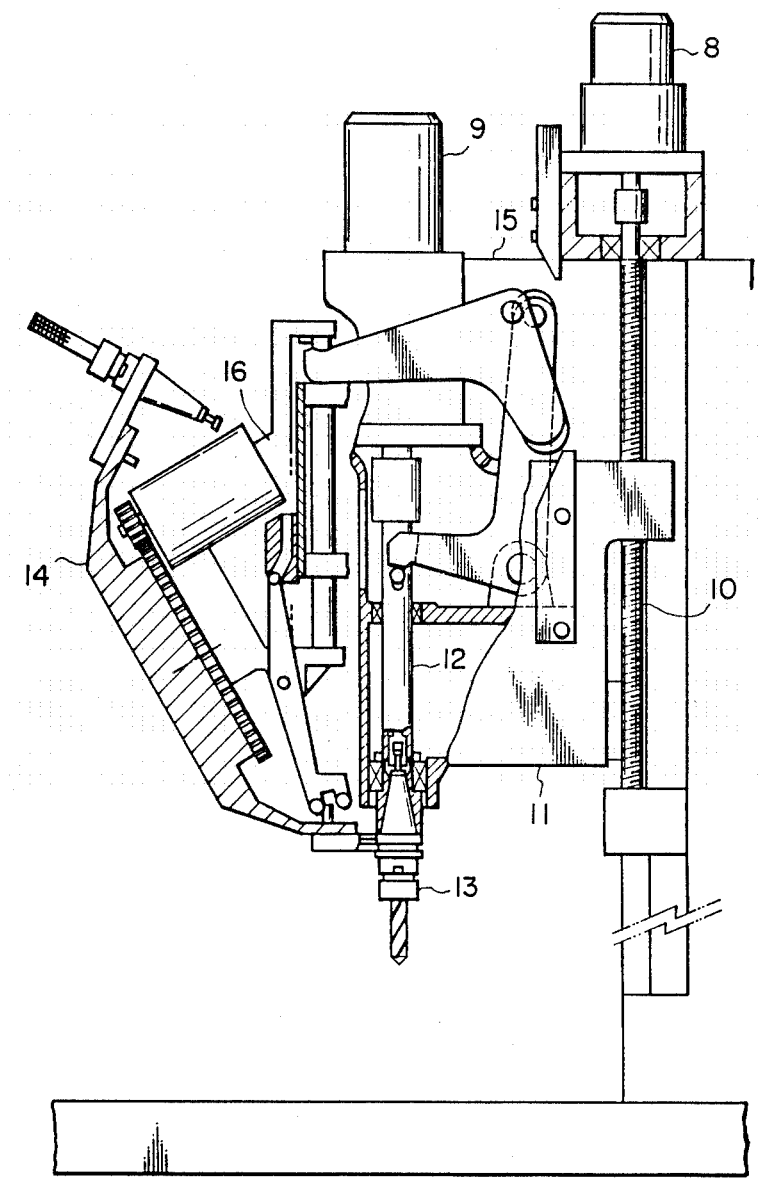
FIG. 7 is a cross-section showing the structure of the machine tool of the embodiment of FIG. 1.

FIG. 7 shows the structure of the machine tool provided with an automatic tool exchanging device according to the present invention. As shown in FIG. 7, a feed screw 10 is rotated by the feed motor 8 and a spindle head 11 is reciprocatively driven by the feed screw 10. The spindle motor 9 is mounted on the spindle head 11. A main spindle 12 is rotatively driven by the spindle motor 9, and an working tool 13, such as a drill, is attached to the main spindle 12. A tool magazine 14 is supported by a tool supporting table 16 and a frame 15 movable in the axial direction of the main spindle 12 such that the rotational position of the tool magazine may be indexed.

Figure 8:
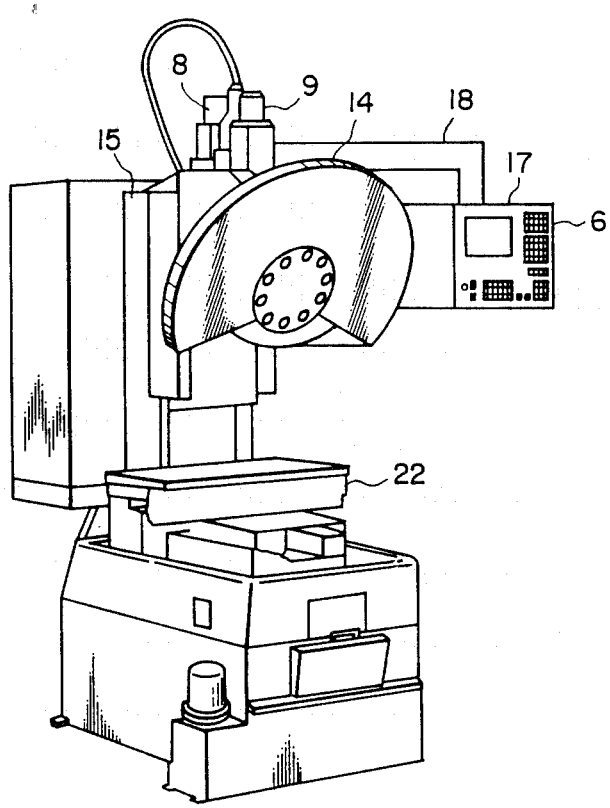
FIG. 8 is a perspective view of the machine tool of FIG. 7.

FIG. 8 is a perspective view showing the exterior of the foregoing machine tool provided with the feed motor 8, the spindle motor 9, the tool magazine 14 with a cover, and the frame 15 on which a computer 17 is attached by a supporting arm 18. The computer 17 includes a keyboard 6 and an X-Y table 22 supports a workpiece for X-Y feeding. The CPU 4, the RAM 5, and the ROM 7 are incorporated in the computer 17.

Figure 9:
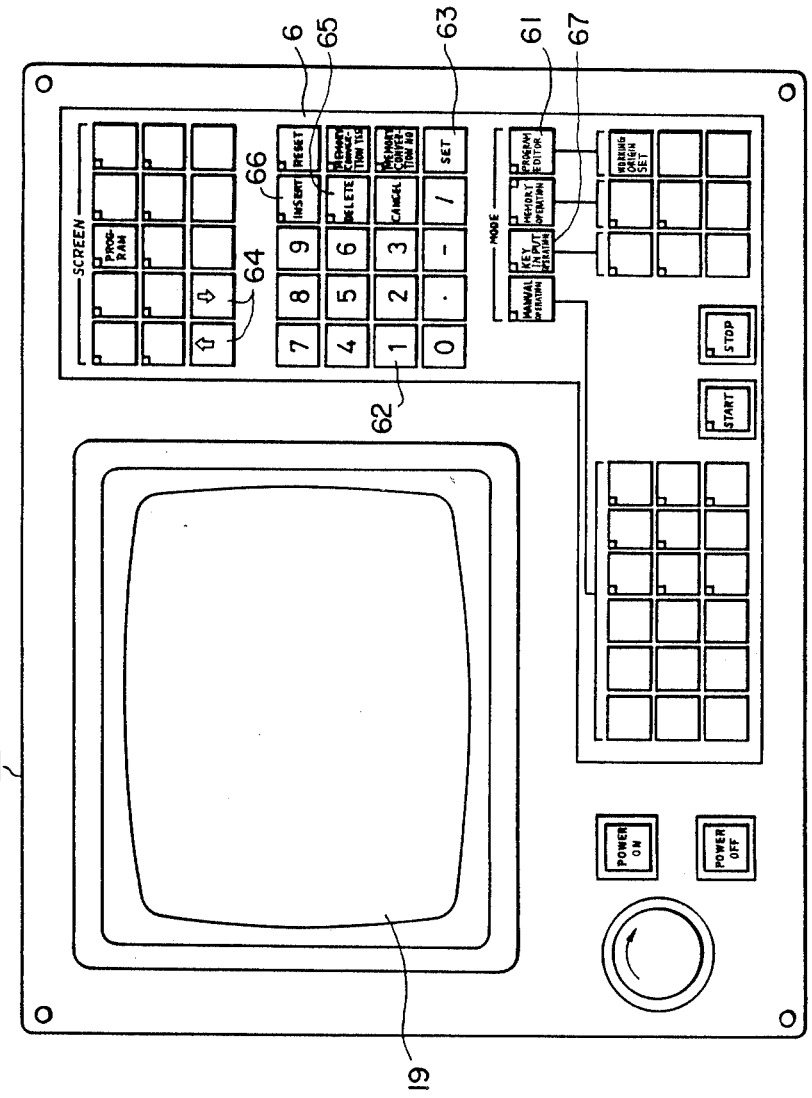
FIG. 9 is a front view of a computer used in conjunction with the machine tool of FIG. 7.

FIG. 9 is a front view showing the computer 17 provided with the keyboard 6 and a display screen 19 of a cathode ray tube (CRT). The computer 17 controls the display on the screen 19. The keyboard 6 includes a program editing key 61, a ten key keyboard 62, a setting key 63, an up/down displacement key 64, a deletion key 65, and an insertion key 66.

The operation of the machine tool of this embodiment will be described with reference to the flowcharts of FIGS. 10 to 13 which represent program instructions for the computer 17 shown in FIG. 9. The final working operation explained with respect to this embodiment is as shown in FIG. 14, and contains tap working with a nominal designation M6 and a pitch 1, and countersunk-bore working with a hole diameter of 5 mm and a counter bore diameter of 8.5 mm these operations are performed on the workpiece at the illustrated dimensional positions.

Figure 10:
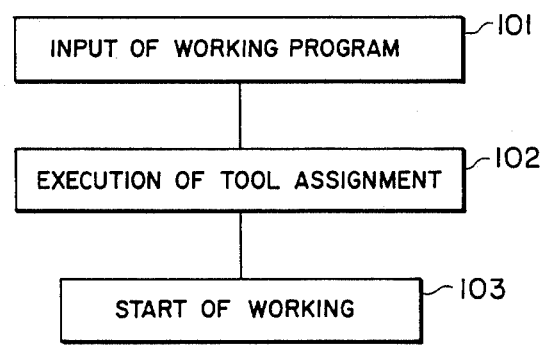
FIG. 10 is a flowchart showing a method for performing working operations on a workpiece by using the machine tool of FIG. 7.

In order to perform working on a workpiece by using the machine tool of this embodiment, as shown in the flowchart of FIG. 10, a working program is entered in step 101, tool assignment is performed in step 102, and working operations are commenced in step 103.

A working program of this embodiment is such that, as shown in the working program table of FIG. 15, in a first step having step number 01, tap working is performed with the illustrated various components, and in a second step having step number 02, countersunk hole working is performed with the illustrated various components.

Referring to computer screens 19 shown in FIGS. 16 to 22, various states of entry of the working program of FIG. 15 will be described.

Figure 16:
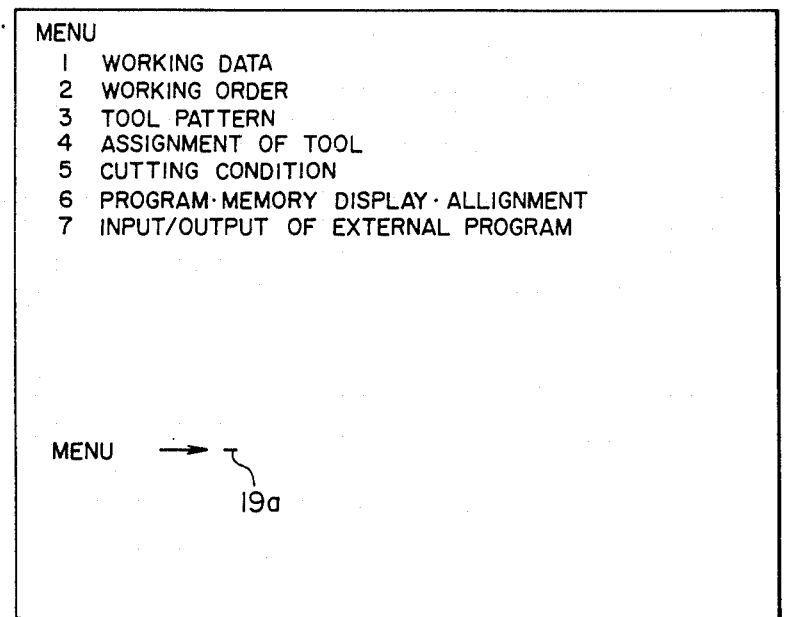

Entry of the foregoing working program is performed in the following manner. Upon depression of the program editing mode key 61 on the keyboard 6 of FIG. 9, a program screen is selected and seven menus are displayed in a program display area disposed on the screen 19 at an upper portion thereof as shown in FIG. 16. Further entry of the menu number is requested by a cursor 19a in an entry request display area. Since a working data mode with the menu number (1) should be selected to enter the working program of FIG. 15, the number "1" of the keyboard 62 and the setting key 63 in FIG. 9 are pushed to enter the working data mode.

Figure 17:
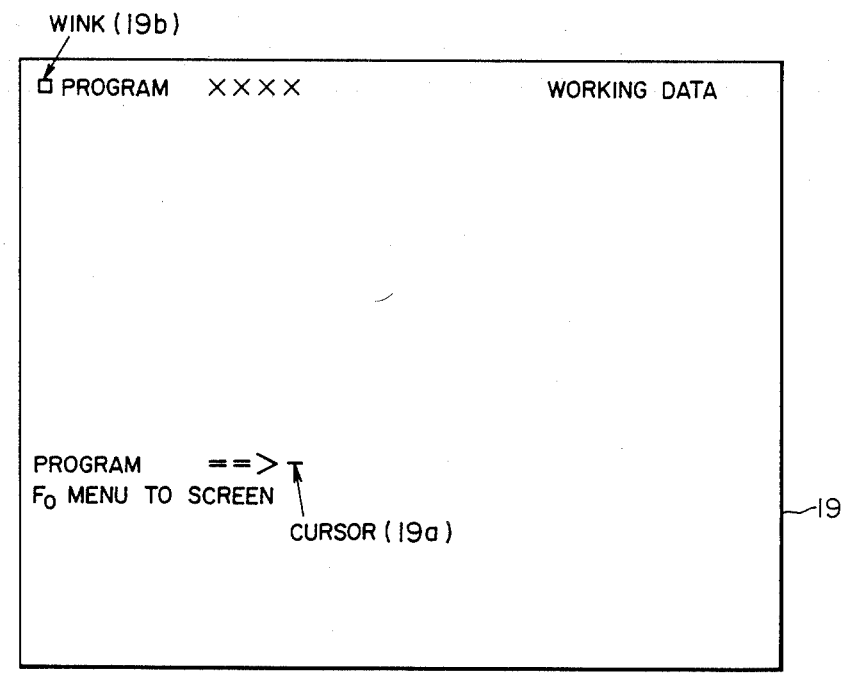
Figure 19:
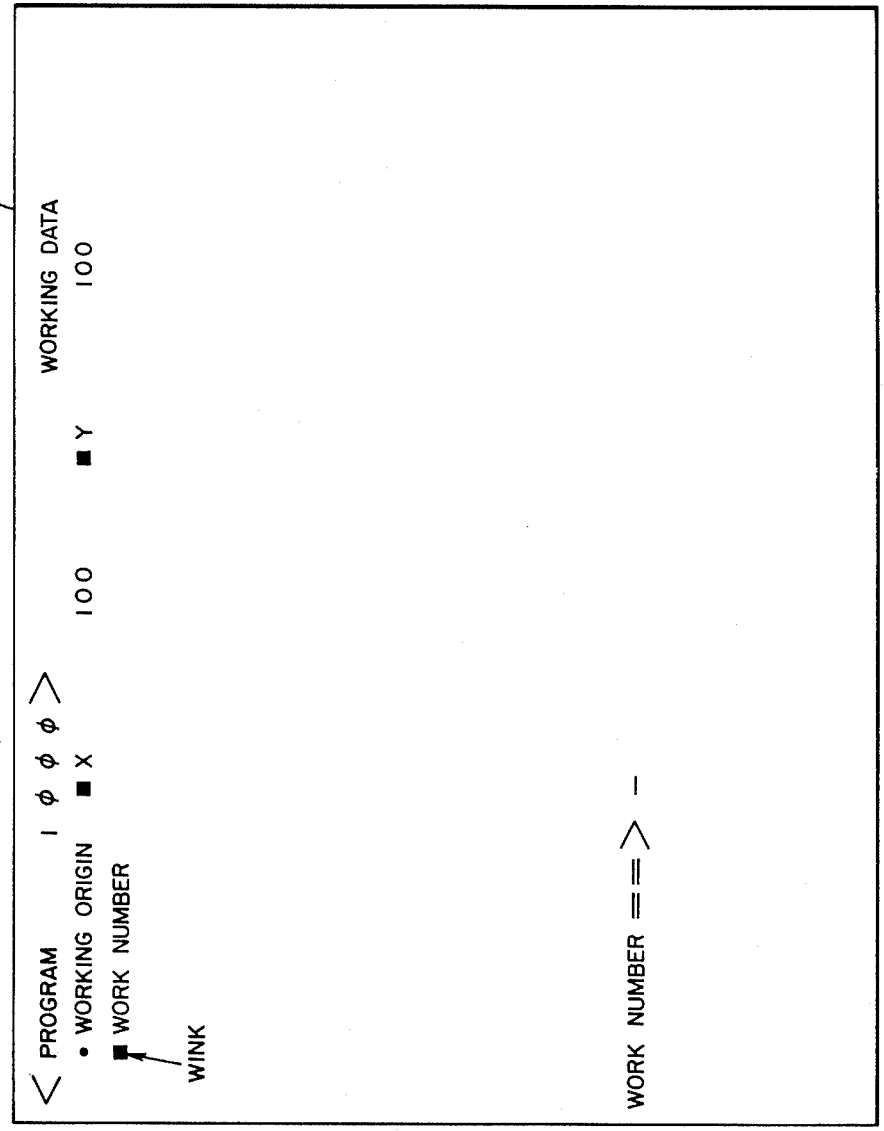

Upon entering the working data mode, the display as shown in FIG. 17 appears on the screen 19 and the program number is requested by the cursor 19a. Then, for example, assuming that the program number is "1000", the number "1000" is entered by the keyboard 62 and the setting key 63 is pushed. The program number is shifted to the program display area at the upper portion of the screen 19 which is changed into that shown in FIG. 18.

Since an X-coordinate of a working origin is requested, the X-coordinate "100" in the working program of FIG. 15 is entered as the working origin by the keyboard 62 and the setting key 63 is pushed. Next, since a Y-coordinate of the working origin is requested, the Y-coordinate "100" is entered in the same manner as the X-coordinate and the setting key 63 is pushed so that the screen 19 is changed into that shown in FIG. 19. Here, entry of the number of the workpiece is requested. Since the workpiece is a single one as shown in the working program table of FIG. 15 in this embodiment, the number "1" is entered by the keyboard 62, and the setting key 63 is pushed.

Figure 20:
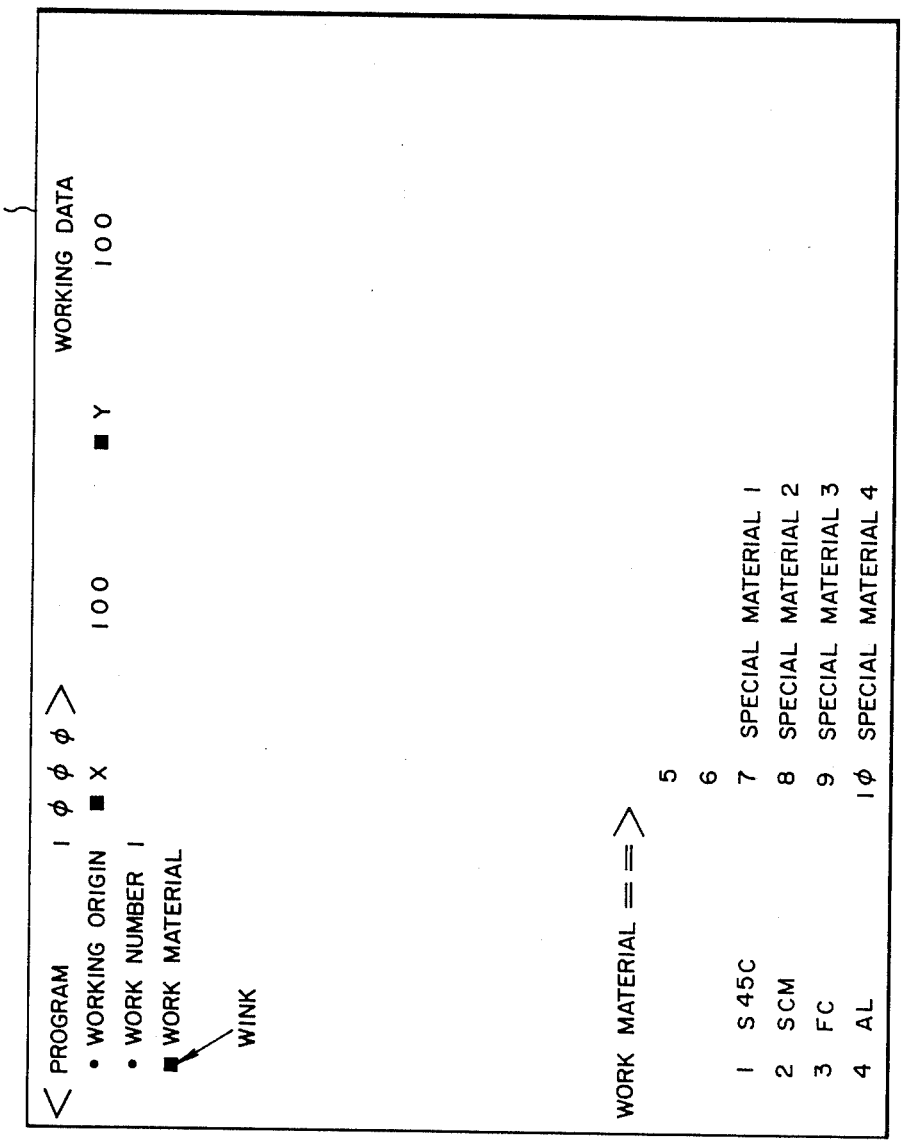

The screen 19 is changed into that of FIG. 20, wherein various qualities of workpiece materials and menu numbers are displayed in an instruction data display area disposed on the screen 19 at a lower portion thereof, and entry of the quality of material of the workpiece is requested in the entry display area. For example, assuming now the quality of material is carbon steel S45C, the number "1" is selected from the menu numbers in the instruction data display area at the lower portion of the screen 19 and entered by the keyboard 62 and the setting key 63.

Figure 21:
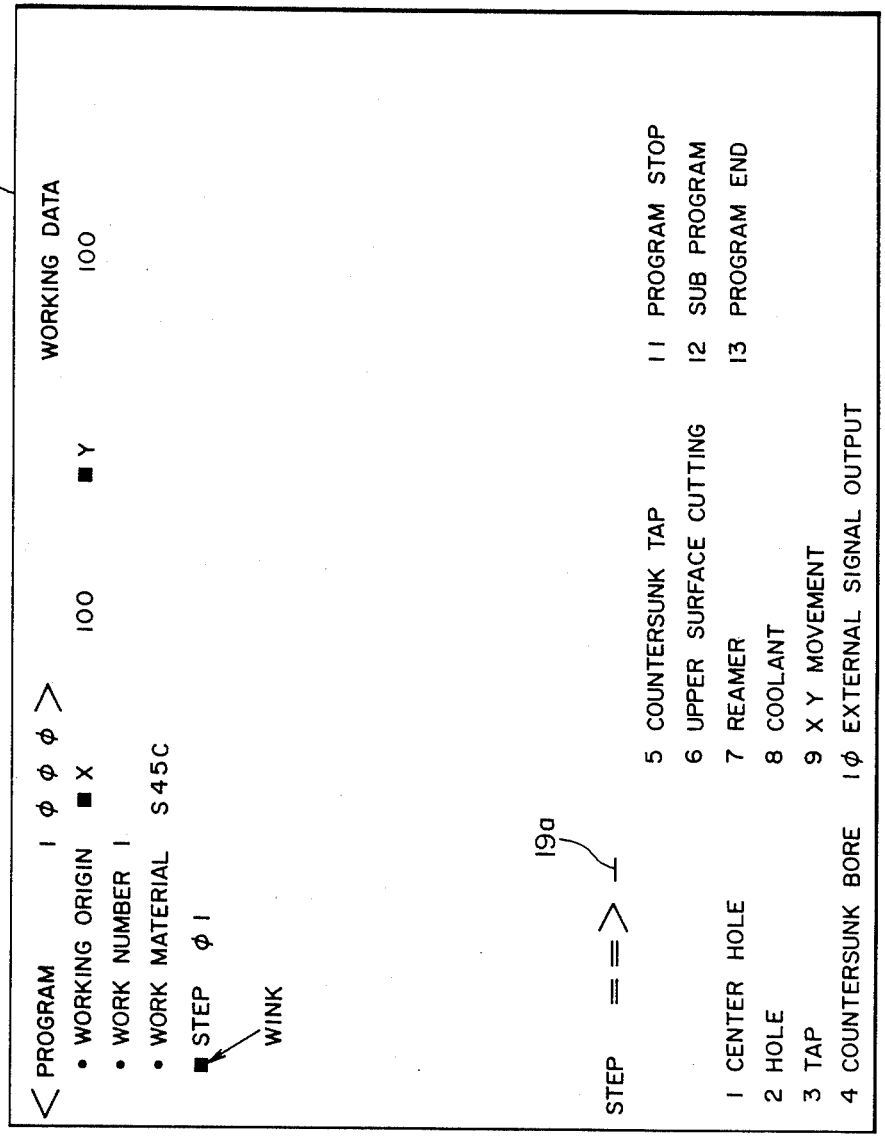

The screen 19 is then changed into that of FIG. 21. A working pattern table is displayed in the instruction data display area at the lower portion of the screen 19 as shown in FIG. 21 and a request is displayed to enter the kind of working operations selected among center hole working, drill working, tap working, countersunk-bore working, countersunk tap working, upper surface cutting, and reamer working. According to the working program of FIG. 15, tap working is to be performed in the first step (the step number 01). Therefore, the tap working number "3" and "setting" are entered. The screen 19 is then changed into that of FIG. 22 and entry of the kind of screw thread is requested. Since a metric coarse screw thread is to be formed in this embodiment, the metric coarse screw thread number "1" is entered, and at the same time "setting" is entered. Next, entry of the nominal designation is requested and the number "6" is entered on the basis of the working program of FIG. 15 and "setting" is entered, so that "M6" is displayed in the program display area at a portion after the display of "tap". Finally, since entry of the pitch is requested, "1" and "setting" are entered.

Applying the same rule, the chamfering "required", the Z-axis end "through hole", the prepared hole depth "30" mm, the working depth "25" mm, the workpiece height "40" mm, the return height "45" mm, and the XY coordinates "X=20" and "Y=20" are entered on the basis of the working program of FIG. 15 in response to requests on the screen 19 to make it possible to enter the working program with respect to tap working in the first step.

In the second step, the step number "02", the kind of working "countersunk-bore", the hole diameter "5" mm, the outer bore diameter "8.5" mm, the chamfering "not-required", the Z-axis end "through hole", the working depth "25" mm, the workpiece height "40" mm, the return height "45" mm, the counter bore depth "10" mm and the XY coordinates "X=60" and "Y=35" are entered on the basis of the working program of FIG. 15. The program is then ended (END).

Figure 11:
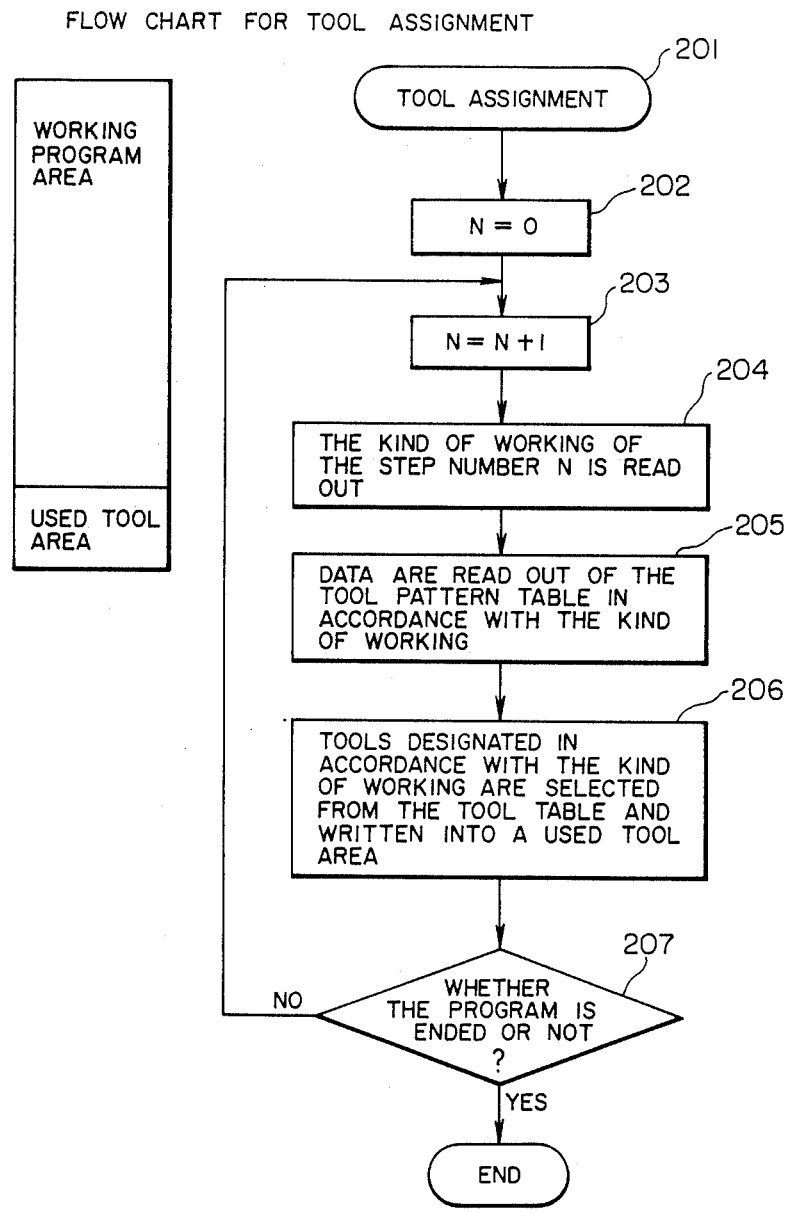
FIG. 11 is a flowchart for performing tool assignment.

In step 102 of FIG. 10 "execution of tool assignment" is performed. The flowchart for performing step 102 is the same as shown in FIG. 11. In the drawing, the tool assignment program is started in response to a command 201, the number of times of assignment, N=0, is registered in response to a command 202, and the number of times of assignment (N=N+1) is registered in response to a command 203. Next, the kind of working operation of step number N(=1) (tap working in the case of this embodiment) is read out of the working program in response to a command 204. Preworking data are read out of the tool pattern table shown in FIG. 5 in accordance with the kind of working operations in response to a command 205. That is, since the first step is tap working requiring chamfering in this embodiment, it is read that the tools necessary for the tap working are "1:center drill", "2:drill", "3:chamfering tool", and "4:tap." This information is retrieved from the tool pattern table of FIG. 5, as the preworking data.

In response to a command 206, the tools designated in accordance with the kind of working operations are selected from the tool table of FIG. 3 (on the basis of the working program) and written into a used tool area (as the tool information). A check is made as to whether the program is ended or not in response to a command 207, and if NO, return is made to command 203 so that the commands 203 to 206 are executed again.

Since the second step is countersunk bore working (requiring no chamfering) in the first embodiment, in response to the commands 203 to 206; "1:a center drill" and "2:countersunk drill" are read out of the tool pattern table of FIG. 5 as the preworking data. Tools having tool names applicable to the preworking data are selected from the tool table of FIG. 3 and the tools designated in accordance with the kind of working from a working program area are written into the used tool area with the appropriate tool numbers. Next, a check is made to determine whether the program should be ended or not in response to the command 207, and if YES, the tool assignment program is ended. Thus, the step 102 for executing the tool assignment is completed to make it possible to execute the working initiation step 103 of FIG. 10.

Figure 12:
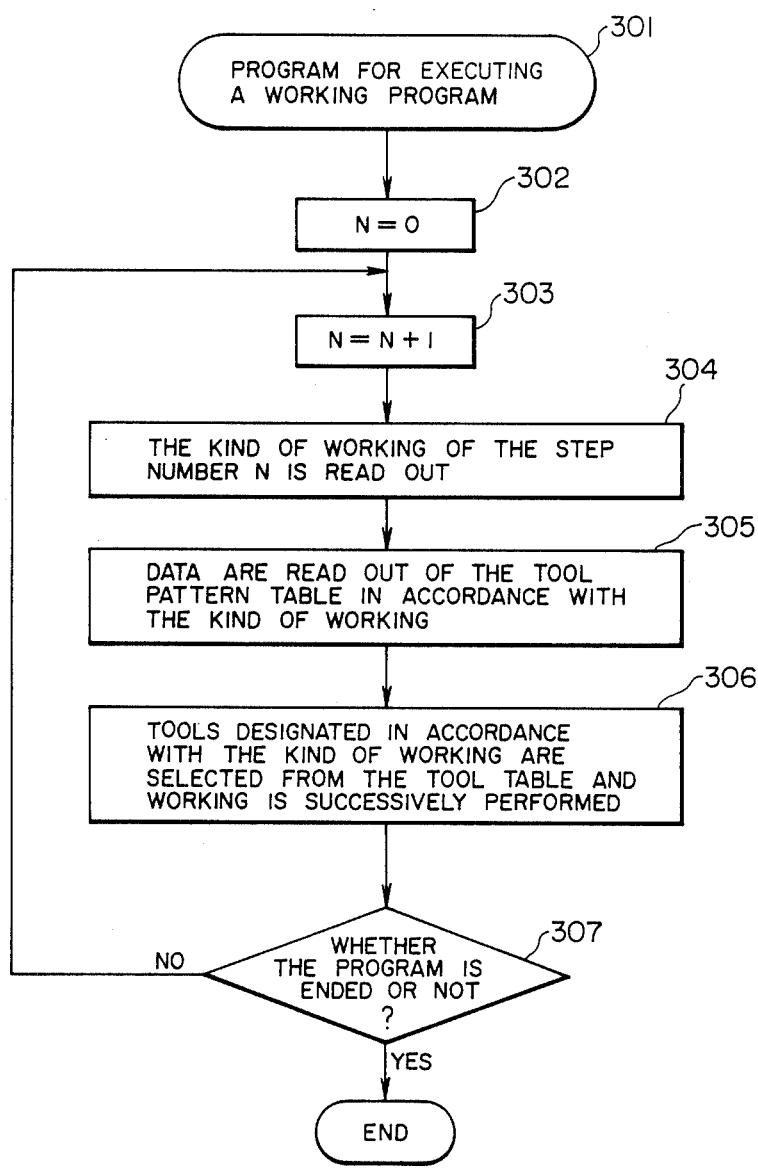
FIG. 12 is a flowchart showing the execution of a working program.

Initiation of execution of the working program is performed on the basis of the flowchart shown in FIG. 12. A program for executing the working program is started in response to a command 301. The number of times of execution, N=0, is registered in response to a command 302 and the number of times of execution, N=N+1, is registered in response to a command 303. The kind of working operation in the step number N is read out in response to a command 304. Data are read in from the tool pattern table of FIG. 5 in accordance with the kind of working operation and the preworking step is read out in response to a command 305.

In response to a command 306, tools with tool numbers designated in accordance with the kind of working operation are selected from the tool table of FIG. 3 and working is successively performed. A check is made as to whether the working program should be ended or not in response to a branch command, and if NO, control is returned to the command 303 so that the commands 303 to 307 are executed again. If YES, the execution of the working program is ended. The status of execution of the working program is as described above briefly. However, referring to the flowchart of FIG. 13, an example of execution of tap working will be further described.

Figure 13:
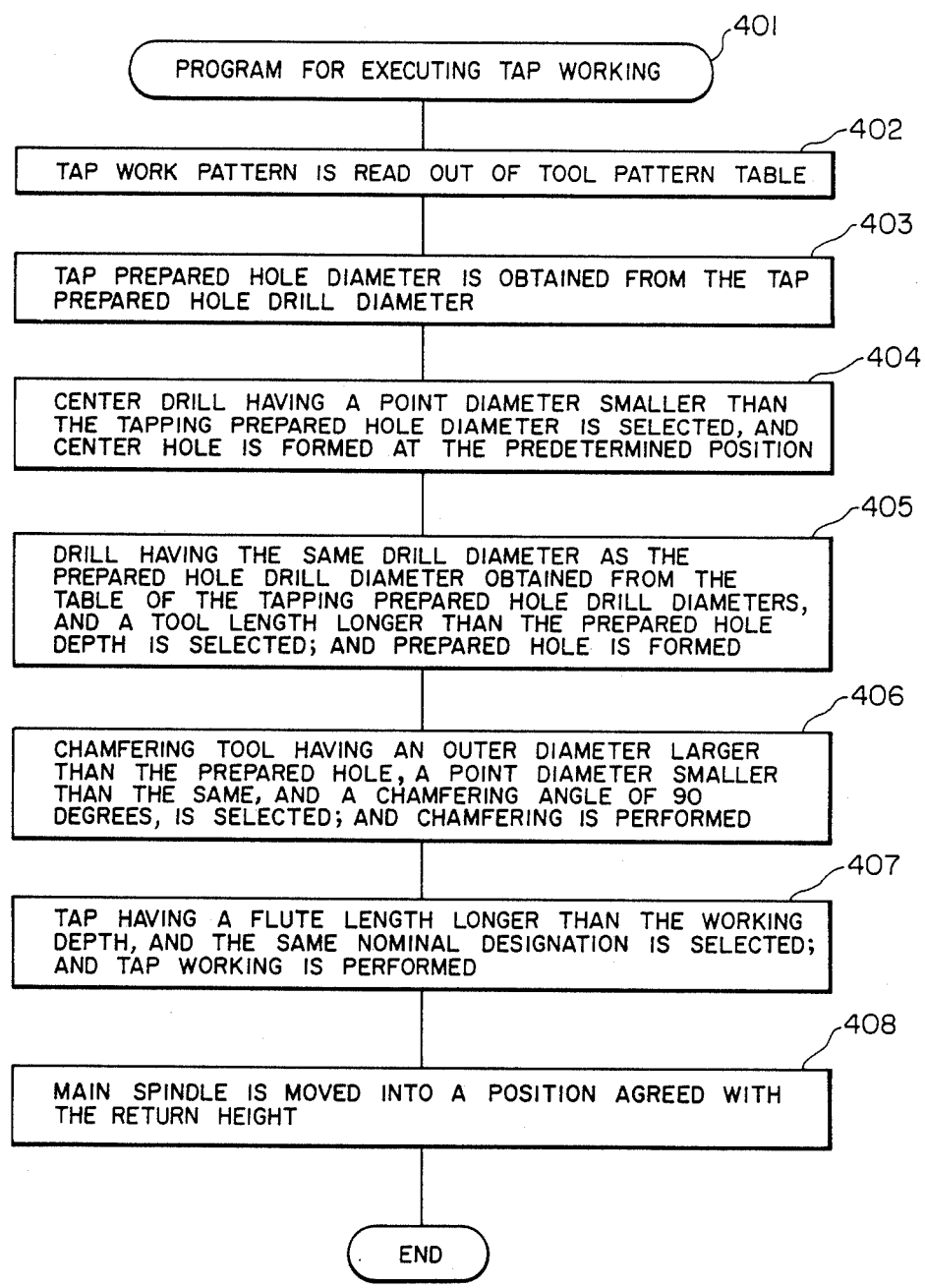
FIG. 13 is a flowchart showing a program for performing tap working.
Figure 14A:
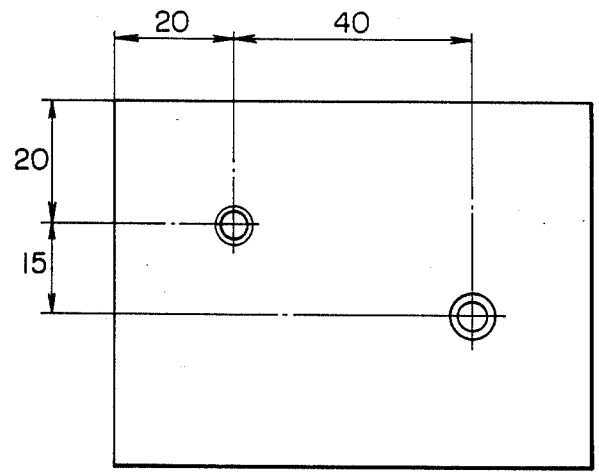
FIGS. 14a and 14b are a plan and a cross-section views respectively, showing the final results of working operations as described in FIG. 13.
Figure 14B:
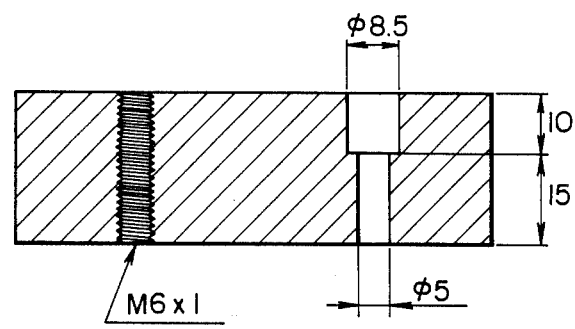

In FIG. 13, in response to a command 401, a program for executing tap working is started. In response to a command 402, tap working pattern data, which means that tools "1:center drill", "2:drill", "3:chamfering tool" and "4:tap" are required in this order, are read in from the tool pattern table of FIG. 5, and a preworking step is read out. In response to a command 403, the tap hole diameter is obtained from the tap hole drill diameter table of FIG. 6, and, for example, in the case where the metric coarse screw thread with the nominal designation M6 and the pitch 1 is to be formed as in this embodiment, the prepared hole drill diameter 5.0 mm is read out as the preworking data. Next, in response to a command 404, the tool number 03 corresponding to a center hole drill having a point diameter which is smaller than the tap hole diameter (5.0 mm) is selected from the tool table of FIG. 3 showing the tool information. A center hole is formed in a predetermined position designated by the working program.

In response to a command 405, a drill (with the tool number 02) having the same drill diameter as the hole drill diameter (5 mm) obtained from the tap hole drill diameter table of FIG. 6 and having a tool length longer than a prepared hole depth (30 mm) is selected from the tool table of FIG. 3, and the prepared hole working operation is performed. A command 406 causes a chamfering tool (with the tool number 04) having a diameter larger than the prepared hole diameter (5 mm), a point diameter smaller than the same (5 mm), and the chamfer angle of 90 degrees to be selected from the tool table of FIG. 3 and chamfering is performed. In response to a command 407, a tap (with the tool number 05) having a flute length longer than the working depth (25 mm) and a nominal designation (M6) is selected from the tool table of FIG. 3 and tap working is performed. The main spindle is moved into a position aligned with the return length (45 mm) in response to a command 408. Thus, the execution of tap working entered as the first step of the working program is ended (END).

According to the foregoing first embodiment, since a machine user can edit the working program by successively entering the final working step and the associated dimensions shown in a planning drawing in response to the inquiries on the CRT screen, the programming of the machine by the user is simplified. Further, since numerical control languages (NC languages) are not required in entering the final working step, etc., the programming is easily performed. It is possible to enter the order of tools, the selection of tools, etc., for the working operations as data separately in the tool information storage means and the preworking step storage means.

Description has been made above concerning tap working and the countersunk-bore working in the first embodiment. It is also possible in the case of the center hole working, drill working, countersunk tap working, upper surface cutting, reamer working, countersunk reamer working, and the like, to execute the preworking and final working operations by simply entering a working program into the machine in the same manner as described above with regard to tap forming and the flanged bore working.

Next, referring to the drawings, an arrangement of a second embodiment of the present invention will be described.

Figure 24:
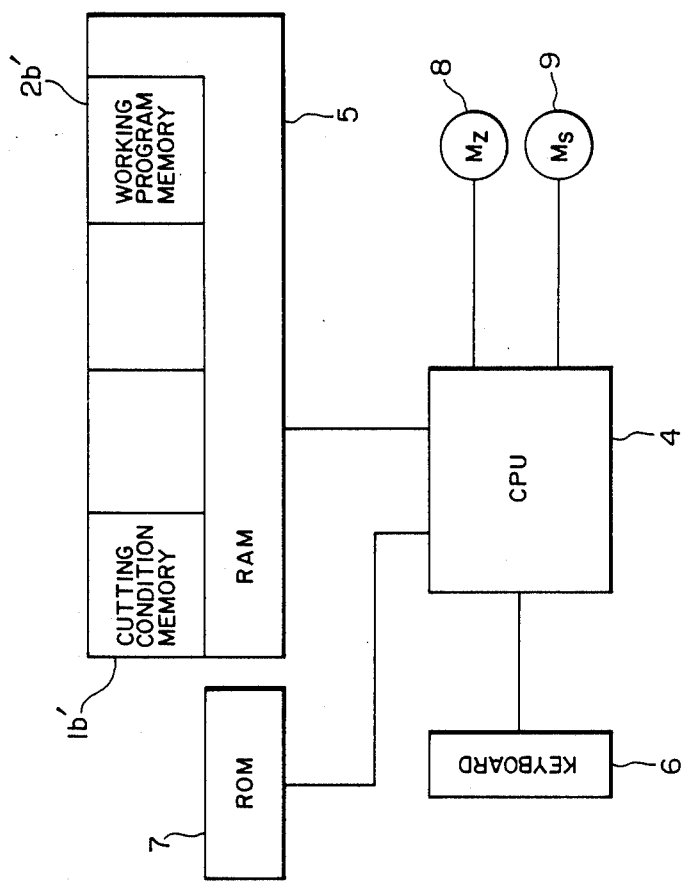
FIG. 24 is an expanded block diagram of the machine tool of FIG. 23.

FIG. 24 is a block diagram showing the structure of a machine tool of the second embodiment. In the drawing, a RAM 5 is provided with a cutting condition memory $1b'$ and a working program memory $2b'$, the former corresponds to a first storage means for storing cutting conditions for every kind of working operation for every quality of workpiece material and the latter corresponds to a second storage means for storing a working program for providing instructions of the kind and quality of working operations.

A CPU 4 constitutes a working control means and is connected to a ROM 7 which stores a program for instructing the CPU 4 to read stored data from the cutting condition memory $1b'$ and the working program memory $2b'$ and for causing the CPU 4 to utilize the stored contents to control a feed motor 8 and a spindle motor 9 so as to perform working operations. Further, the CPU 4 is connected to a keyboard 6 so that it is possible to store the working program in the working program memory $2b'$ and to change and amend the stored contents of the cutting condition memory $1b'$ through the operation of the keyboard 6.

FIG. 25 is a cutting condition table showing the contents stored in the cutting condition memory $1b'$, which are the cutting conditions for every kind of working in the case where the quality of the workpiece material is carbon steel S45C used for machine structures. In FIG. 25, in the leftmost column, various kinds of working operations are indicated with terms, such as, center hole drilling, drilling, tapping (blind hole, through hole), chamfering tooling, chamfering drilling, countersunk drilling, countersinking tooling, drill tapping, endmilling, reaming, and drill reaming. In a second column, the tools necessary for the working operations shown in the first column are specifically indicated with the words, such as, center hole drill 1, drill 1, spiral tap 2, point tap 2, chamfering tool 1, etc. In a third column, a peripheral speed m/min, which is one of the cutting conditions, is indicated for every tool with such expressions such as 10.0, 12.0, 8.0, 8.0, 8.0, hole 12.0, chamfering 8.0, etc. In a fourth column, a feed rate mm/min, which is a second one of the cutting conditions, is indicated for every tool with such expressions as, 0.05, 0.1, *, *, 0.08, 0.15, 0.1, etc. The mark "*" represents the operation to perform feeding synchronized with the revolution (a peripheral speed) of tap working.

The stored contents of the cutting condition memory $1b'$ include another cutting condition table for various kinds of qualities of workpiece materials, such as, aluminum A, stainless steel SUS304, cast iron FC, and so on, in addition to the cutting condition table of FIG. 25 for carbon steel S45C as the quality of workpiece material. Further, it is possible to change or amend the data stored in the cutting condition tables by the keyboard 6 of FIG. 24.

Figure 26A:
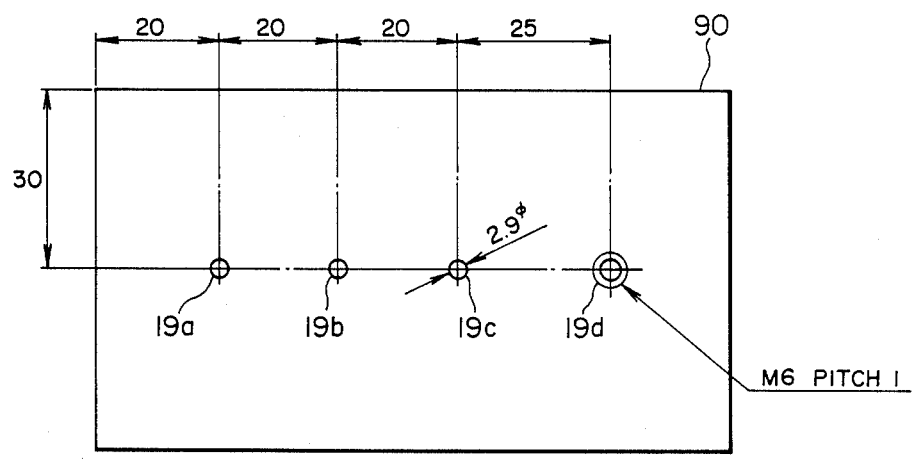
FIGS. 26a and 26b are plan and cross-section views, respectively, of the results of working operations performed on a workpiece.
Figure 26B:
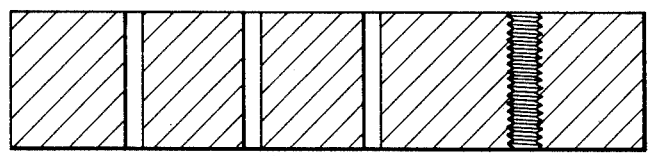

FIGS. 26(a) and 26(b) are planning drawings showing a finally worked shape of a workpiece 90 to be worked in this embodiment and working operations are performed on the workpiece 90 to form three drill holes 19a to 19c each having a diameter of 2.9 mm and one tap hole with nominal designation M6 and a pitch of 1.

FIG. 27 shows a working program stored in the working program memory $2b'$ for performing the various working operations illustrated in the planning drawings of FIG. 26. In FIG. 27, the kinds of working operations are shown with the step numbers 01 to 05 as "working manner" and carbon steel S45C has been entered as the type of workpiece material. The working program of FIG. 27 is such that the working manner, the hole diameter, and the XY coordinates have been entered numerically or alphanumerically with respect to the drill working with the step numbers 01 to 04, and the working manner, the normal designation, the pitch, and the XY coordinates have been entered with a numerical or alphanumerical value as to the tap working of step number 05. Now, tap working with step number 05 is performed with a prepared hole having a diameter of 0.5 mm formed by the drill working operation in step number 04.

Next, the operation of the machine tool of this second embodiment will be described.

The storing of the cutting conditions into the cutting condition memory $1b'$ in the RAM 5 of FIG. 24 may be completed off-line or on-line by a machine manufacturer or by a machine user before the start of use of the machine tool. This is possible because the cutting conditions for every kind of working operation for every quality of workpiece material contain relatively fixed contents as shown in FIG. 25.

Figure 28:
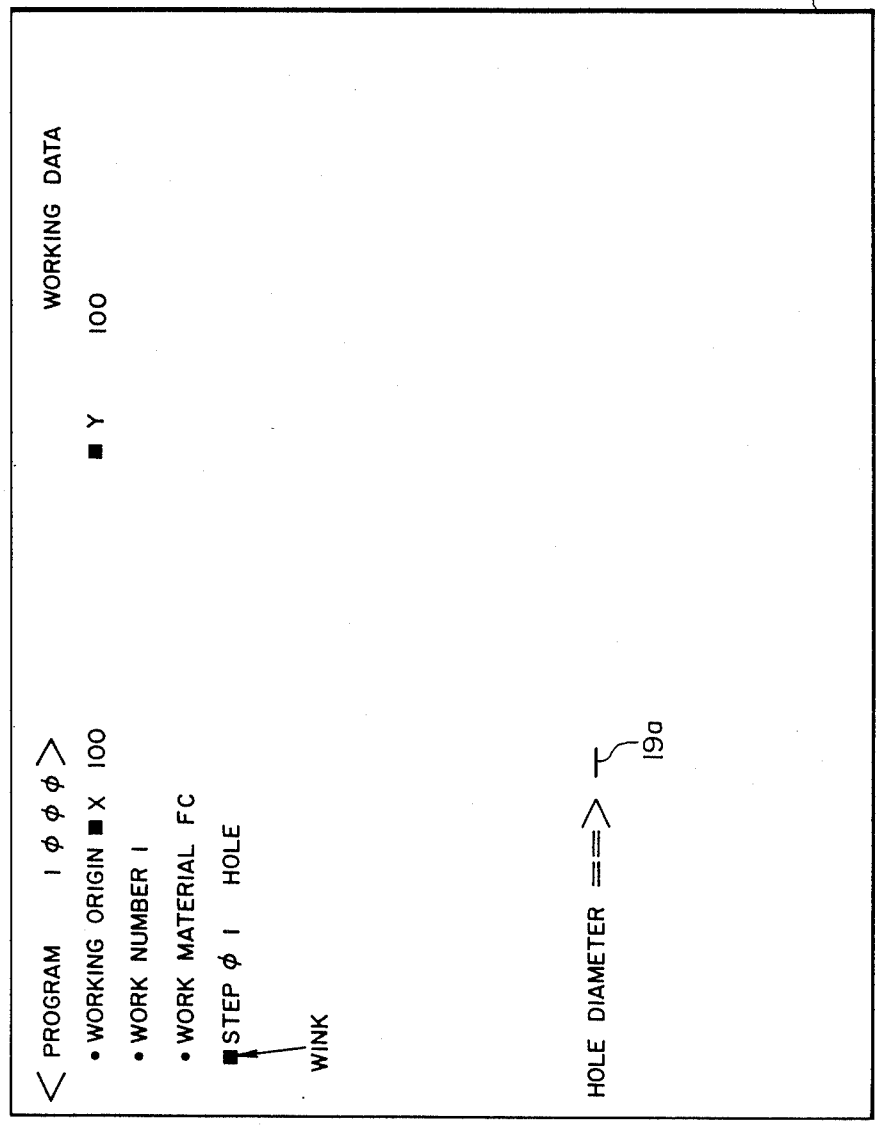
FIG. 28 is a front view of a computer screen during the editing state of the working program.

In order to store the working program of FIG. 27 into the working program memory $2b'$ in the RAM 5 of FIG. 24, the menu number "1", the program number "1000", the working origin coordinates "X=100, Y=100", the workpiece number "1", and the quality of workpiece material "S45C" are entered on the basis of the working program table of FIG. 27 and in response to the inquiries displayed on the screen 19, as described above with reference to FIGS. 16 to 22. Since in the first step of the second embodiment drill working with step number 01 shown in FIG. 27 is performed, the menu number "02" and "setting" are entered. The screen 19 is changed into that illustrated in FIG. 28, and entry of the hole diameter is requested by a cursor 19a. Accordingly, the hole diameter "2.9" mm is entered through the keyboard 62, and the setting key 63 is pushed. Next, since entry of the XY coordinates (not shown) is requested, the X-coordinate (=20 mm) and "setting" are entered followed by the Y-coordinate (=30 mm) and "setting" in accordance with step number 01 in the working program table of FIG. 27. Thus, the working program with the step number 01 can be entered in the working program memory $2b'$ of FIG. 24.

In the same manner as in the working program with step number 01, working programs with step numbers 02 to 05 in the working program table of FIG. 27 are entered in the working program memory $2b'$ to make it possible to start the desired working operations.

Figure 29:
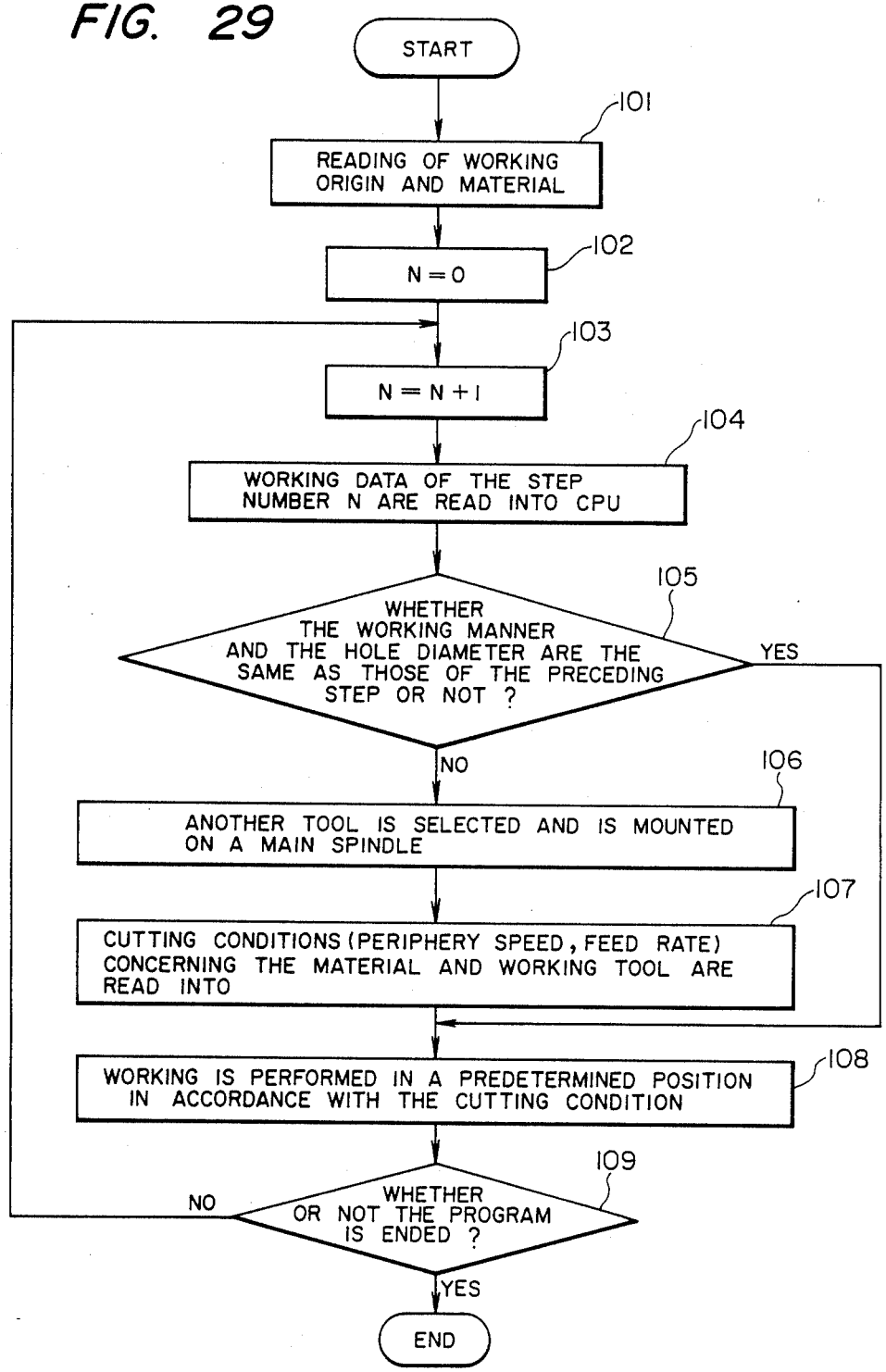
FIG. 29 is a flowchart for executing a working program.

A flowchart for executing the working programs is shown in FIG. 29. When the flow chart of FIG. 29 is started (START), the working origin "X=100, Y=100" and the quality of the workpiece material "S45C" are inputted in response to a command 101; the step number N=0 is registered in response to a command 102; the step number N=N+1 (=1) is registered in response to a command 103; and working data of the step number N (=1) are read into the CPU 4 out of the working process memory 2b' in response to a command 104. A test is made to determined whether or not the working manner and the hole diameter are the same as those of the preceding step in a branching command 105. If the result is YES, the operation is stepped to a command 108, so that working is performed in a predetermined position in accordance with the cutting conditions. If the result of the branching command 105 is NO, the operation is shifted to a command 106 and another tool is selected for mounting on a main spindle 12.

In response to a command 107, the cutting conditions in connection with the quality of the workpiece material "S45C" and the working tool "drill", that is, the peripheral speed 12.0 m/min and the feed rate 0.1 mm/revolution, are read out of the cutting condition table (FIG. 25) of the cutting condition memory 1b' of (FIG. 24), and read into the CPU 4. Next, working operations are performed in a predetermined position (X=20, Y=30) in accordance with the cutting conditions as described above in response to a command 108.

A test is then made as to whether the working program should be ended or not (branching command 109), and if NO, the operation is returned to the command 103, and the step number N=N+1 (=2) is read out of the working program table of FIG. 27 in response to the command 104. A test is then made as to whether the working manner and the hole diameter are the same as those of the preceding step (branching command 105).

The operation proceeds to the command 108 because the working manner of the step number N=2 of the working program of FIG. 27 is the case 4 where the result of the judgement is YES. Working operations are performed in a predetermined position (X=40, Y=30) under the cutting conditions (the peripheral speed 12.0 m/min, the feed rate 0.1 mm/revolution) in response to the command 108. In the case of this embodiment, since working operations with the same working manner and the same hole diameter as those in the preceding step are performed until step number N=3, the operation is returned from the branching command 109 to the command 103. The command 104, the branching command 105, and the command 108 are executed once more.

In step number N=4, the hole diameter is 5.0 (mm), that is, the hole diameter is different from that of the preceding step, and the result of the branching command 105 is NO. Accordingly, the operation is shifted to the command 106 and another tool (a drill having a tool diameter of 5 mm) is selected and mounted on the main spindle 12. Thereafter, the operation is shifted to the command 107, and the cutting conditions (the peripheral speed and the feed rate) in connection with the given quality of workpiece material and the selected working tool are read in response to the command 107.

Working operations are performed in a predetermined position (X=85, Y=30) in accordance with the cutting conditions in response to the command 108, and a test is made as to whether the program should be ended (branching command 109). Since the result of the test is NO, operation is returned to the command 103, and the commands 103 and 104 are executed.

According to the working program of FIG. 27, a fifth step, step number (N=) 05, is tap working and, therefore, the result of the branching command 105 is NO. Operation is then shifted to the command 106 and another tool (point tap 2) is selected for mounting on the main spindle 12. Further, the cutting conditions (the peripheral speed and the feed rate) corresponding to the given quality of workpiece material and the selected working tool are read in response to the command 107 and working operations are performed in a predetermined position (X=85, Y=30) in accordance with the cutting conditions in response to the command 108. Thus, the working program is ended. Accordingly, in the branching command 109, the result of judgement becomes YES and therefore the program is ended (END).

According to the second embodiment as described above, a programmer may successively enter the final working operation and the associated dimensions of the working operation shown in the planning drawing in the working program memory 2b' in response to the inquiries displayed on the CRT screen. There is a significant advantage in that the programming of machine use is simplified. Moreover, it is possible to enter the cutting conditions or the like for the working operations separately from the final working operations and the associated dimensions as data to be stored in the cutting condition memory 1b'. Further, the machine has an advantage that the data can be changed for every program and can be stored as a part of the program.

Next, referring to the drawings, an arrangement of a third embodiment according to the present invention will be described.

Figure 31:
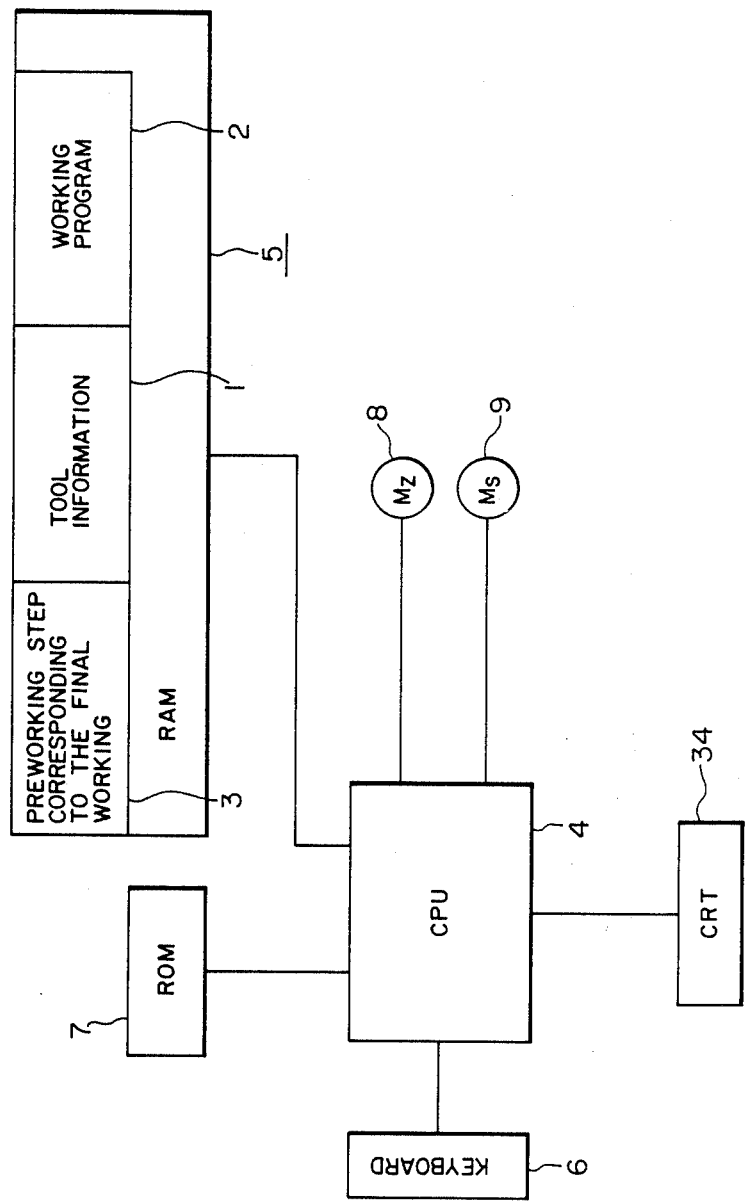
FIG. 31 is an expanded a block diagram of the machine tool of FIG. 30.

FIG. 31 is a block diagram showing the arrangement of a machine tool according to the third embodiment which is substantially the same as that of the first embodiment (FIG. 2). In the drawing, there is provided a RAM 5 for storing tool information 1, preworking step information 3 corresponding to the final working operations, a working program 2, and so on. A storage section of the tool information 1 corresponds to a first storage means 1c for storing the kind and shape of each tool. The stored preworking step information 3 corresponding to the final working operations assists the tool information 1, and the kind and shape of the preworking operations are read together with a tool to be used in this step on the basis of the stored contents of the working program 2. The working program 2 is provided for instructing the positions and shapes of the final working operations successively in the order of working step thereof.

There are further provided a CPU 4 functioning as an operation means 3C, and a cathode ray tube (CRT) 34 constituting a display device controlled by the CPU 4. The CPU 4 is controlled in accordance with the working program 2 stored in a ROM 7 to read the stored contents of the tool information 1 and preworking step information 3 corresponding to the final working operations and to select the tools to be used in the working program 2 for display on the CRT 34. The stored tool information 1 contains, for example, a tool name, a required dimension, a tool length, and residual using time (minute) for each of the tool numbers 01 to 06 shown in the tool table of FIG. 3 in the same manner as the first embodiment. Preferably, about sixty tools may be registered in the tool table of FIG. 3.

As a first kind of stored contents of the preworking step information 3, tool patterns necessary for various kinds of working operations (the final working) are registered as a table, and, for example, in the case of tap working with chamfering, "1:center drill", "2:drill", "3:chamfering tool", and "4:tap" are registered, as shown in the tool pattern table of FIG. 5.

Further, as a second kind of stored contents of the preworking step information 3, for example, in the case of the metric coarse screw thread, the prepared hole drill diameters with respect to the nominal designation and the pitch at the final working step are registered and stored as a table. This is shown in the table of tap prepared-hole boring drill diameters of FIG. 6. For example, a prepared hole diameter for a tap has a nominal designation M6 and a pitch 1 of 5.0 (mm).

The editting of the working program 2 is performed in the same manner as in the first embodiment.

In order to display images of the selected tools for processing by the machine tool of the third embodiment as shown in the flowchart of FIG. 10, step 101 for entering the working program is performed and thereafter tools to be used in accordance with the working programs are displayed on the CRT screen 19 in step 102 for executing tool assignment. When the tools displayed on the CRT screen 19 have been properly mounted on a tool magazine 14, the working initiation step 103 can be performed.

The final working operations in this third embodiment are the same as shown in FIG. 14 with respect to the first embodiment. That is, a tap with a nominal designation M6 and a pitch 1, and a countersunk-bore with a hole diameter of 5 mm and a counter bore diameter of 8.5 mm are formed in a workpiece at the illustrated dimensional positions.

Therefore, according to the working program in the third embodiment, as shown in the working program table of FIG. 15, the tap working operations are performed in accordance with the various components displayed as step number 01, and the countersunk-bore working operations are performed in accordance with the various components displayed as step number 02.

Next, the operation of the machine tool in the third embodiment will be explained by referring to the drawings.

Entry of the working program is performed on the basis of the working program table of FIG. 15 and in response to the inquiries on the computer screen 19 shown in FIGS. 10 to 22, in the same manner as the first embodiment.

Figure 32:
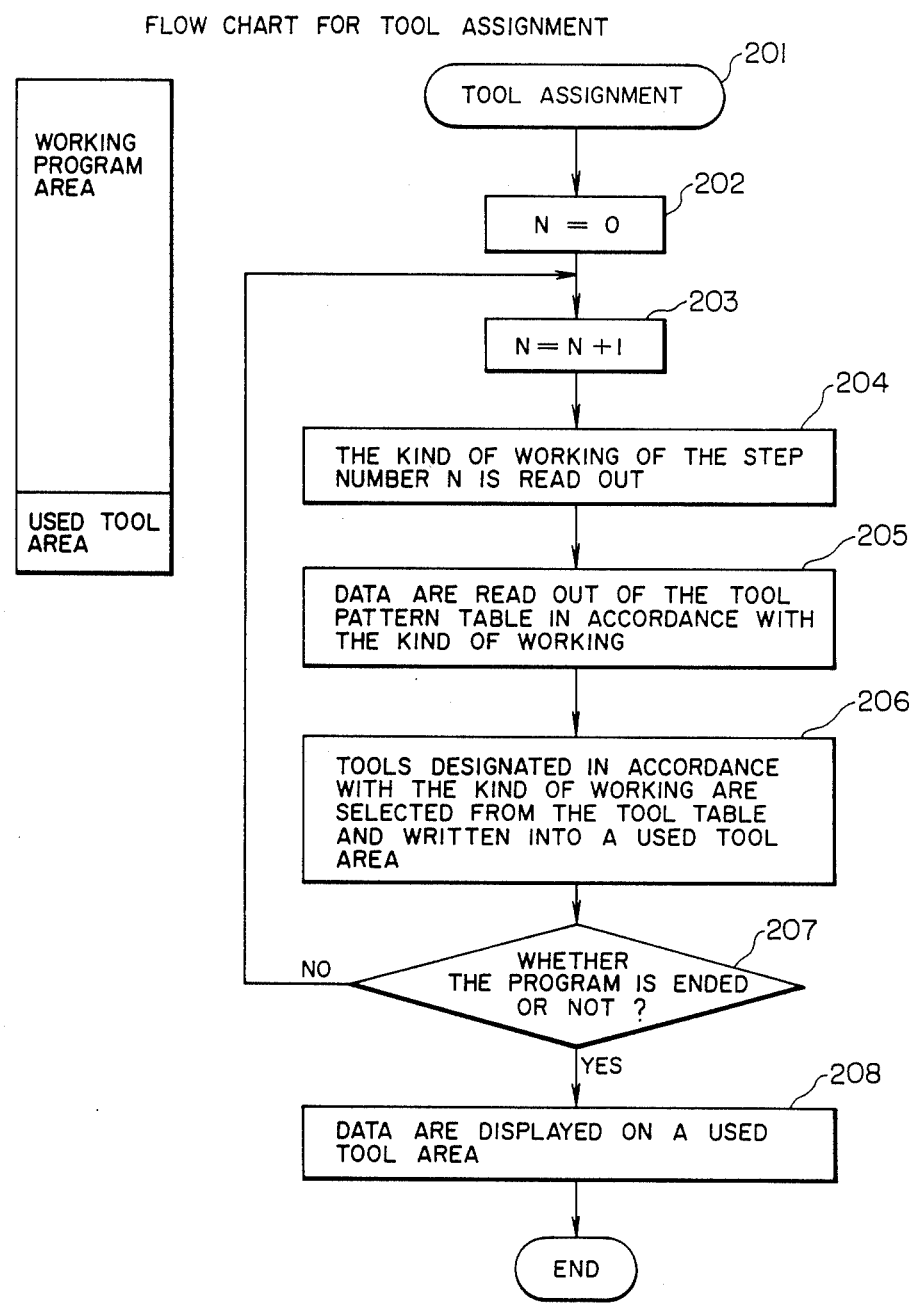
FIG. 32 is a flowchart showing a program for performing tool assignment.

Next, step 102 of FIG. 10, that is "execution of tool assignment" is performed in accordance with the flowchart shown in FIG. 32. The flowchart is substantially the same as the tool assignment flowchart of FIG. 11 in the first embodiment, except that in the flowchart of FIG. 32, a test is made as to whether the tool assignment program has ended (branching command 207). If YES, data are displayed side by side on a used tool area in response to a command 208, and the program is ended.

Thus, if a key entry mode is selected by pushing the key entry operation key 67 illustrated in FIG. 9 after the execution of the tool assignment has been completed, the tools mounted in the tool magazine are displayed on the CRT screen 19. The program with the number "1000" to be operated next is entered by the keyboard 62, so that the tools necessary for the program (1000) are successively displayed in an instruction data display area at a lower portion of the CRT screen 19 in the order of use as shown in FIG. 33.

Therefore, a machine user can initiate the desired working by mounting the used tools onto the tool magazine 14 as shown in FIGS. 7 and 8 at proper positions with magazine numbers 1 to 10 in accordance with the order as displayed on the CRT screen 19.

The initiation of execution of the working program (START) is performed on the basis of the flowchart of FIG. 12 in the same manner as the first embodiment. Further, referring to a flowchart illustrated in FIG. 34, an example of the execution of the tap working will be described.

Figure 34:
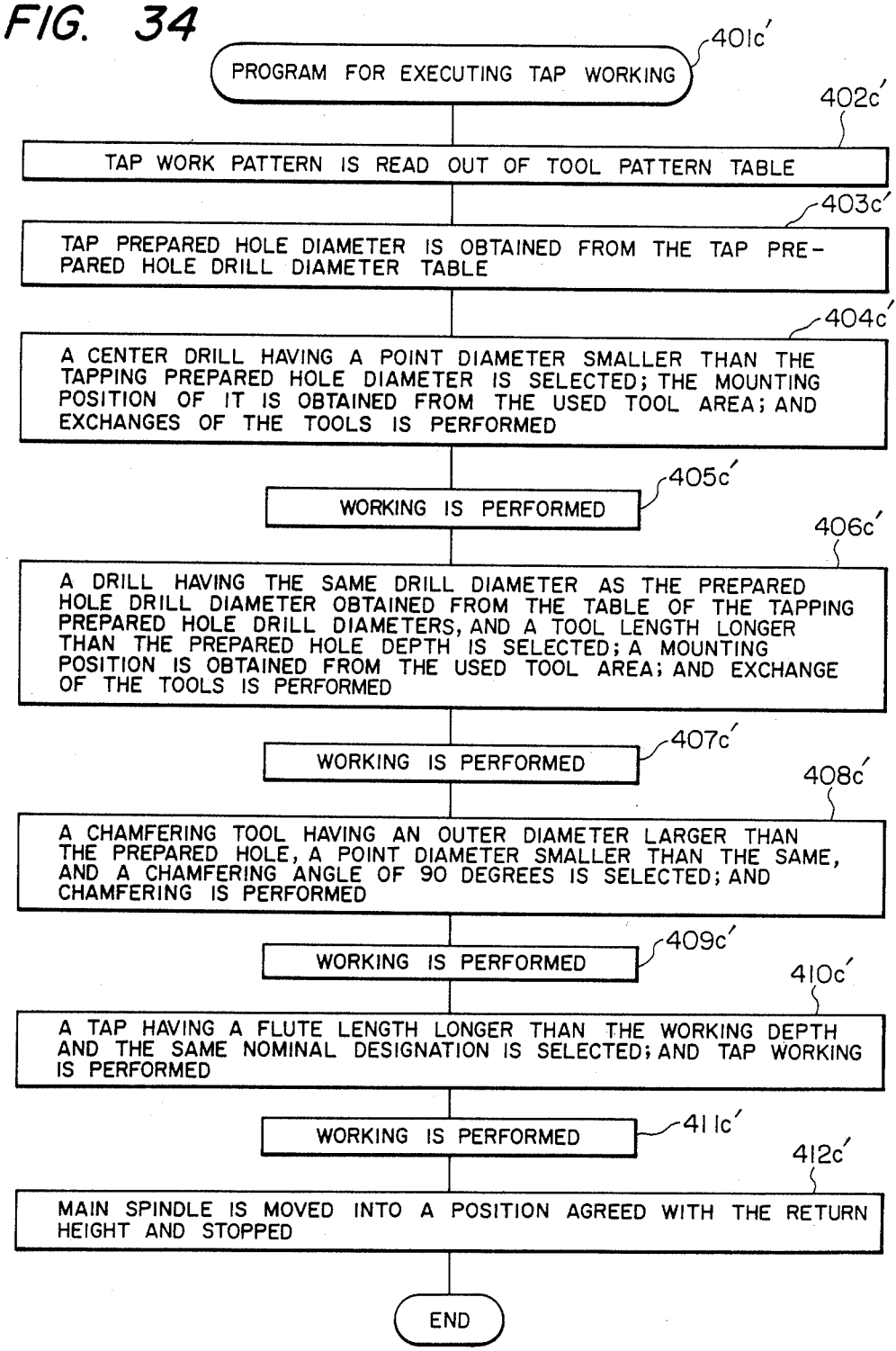
FIG. 34 is a flowchart of a program for performing tap working.

The flowchart of FIG. 34 is substantially the same as that shown in FIG. 13 in the first embodiment. Commands 401c to 403c of FIG. 34 are the same as commands 401 to 403 of FIG. 13, but according to the flowchart of FIG. 34, in response to a command 404c a center drill with tool number 02 and a point diameter smaller than the tapping prepared hole diameter (5.0 mm) is selected from the tool table of FIG. 3. The mounting position of the center drill in the magazine is obtained from the used tool area; and an exchange of the tools is instructed.

Center hole working is performed in a predetermined position designated on the basis of the working program in response to a command 405c. In response to a command 406c, a drill (with tool number 02) having the same drill diameter as the prepared hole drill diameter (5 mm) obtained from the table of the tapping prepared hole drill diameters of FIG. 6, and a tool length longer than the prepared, hole depth (30 mm) is selected from the tool table of FIG. 3. A mounting position in the magazine is obtained from the used tool area and an exchange of the tools is instructed.

Prepared hole working is performed in response to a command 407c. In response to a command 408c, a chamfering tool (with tool number 04) having a diameter larger than the prepared hole (5 mm), a small diameter smaller than the same, and a chamfering angle of 90 degrees, is selected from the tool table of FIG. 3. A mounting position within the tool magazine is obtained from the used tool area and an exchange of the tools is instructed. Chamfering working operations are performed in response to a command 409c.

Next, in response to a command 410c, a tap (with tool number 03) having a flute length longer than the working depth (25 mm) and a nominal designation of ($M_6$) is selected from the tool table of FIG. 3. A mounting position within the tool magazine is obtained from the used tool area and an exchange of the tools is instructed.

Tap working is performed in response to a command 411c. In response to a command 412c, the main spindle is moved into a position in line with the return height (45 mm) and stopped. Thus, the program for the execution of the tap working operations, entered as a first step of the working program, is ended (END). The countersunk-bore working operations of the second step can be performed similarly to the tap working operations.

According to the foregoing third embodiment, since a machine user can edit the working program by successively entering the final working step and the associated dimensions shown in a planning drawing in response to the inquiries on the CRT screen, the programming by the machine user is very much simplified. Further, since numerical control languages (NC languages) are not required in entering the final working step, etc., the programming is further easily performed. It is possible to enter separately the order of tools, the selection of tools, etc., for the working operations as data in the tool information storage means and the preworking step storage means of the machine. Further, since the tools necessary for every step are displayed with the step number in which the tools are to be used, in the order of use, there is such an advantage that it is easy to mount the tools in the tool magazine.

Description has been made concerning the tap working operations in the third embodiment as described above. Also in the case of center hole working, drill working, countersunk tap working, upper surface cutting, reamer working, countersunk reamer working, etc., it is possible to execute the working operations by the machine according to the present invention in the same manner as described above in the tap working operations by simply entering a working program and by displaying images of the tools necessary for every working operation.

Next, referring to the drawings, the arrangement of a fourth embodiment according to the present invention will be described.

Figure 35:
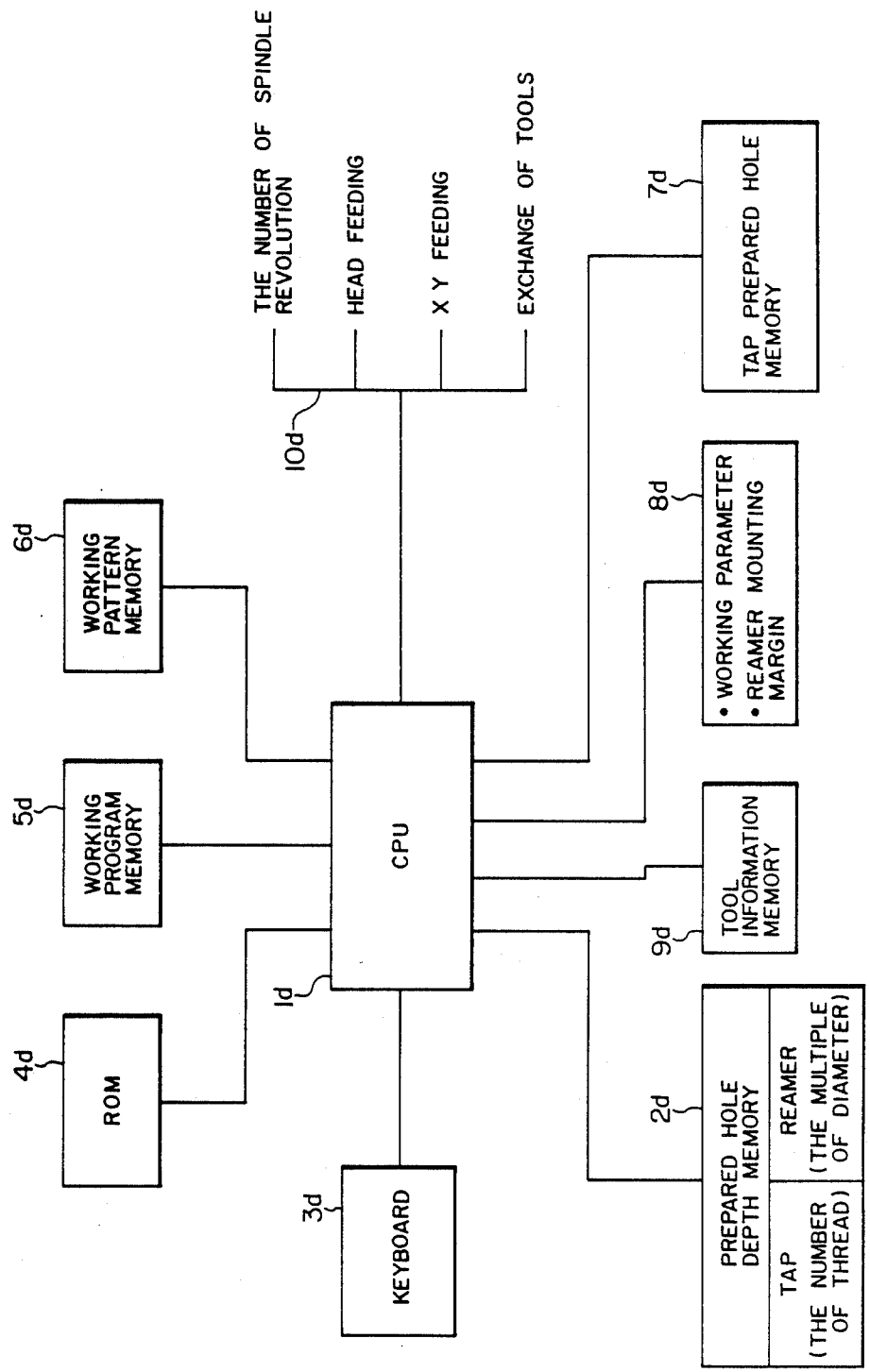
FIG. 35 is a block diagram of a fourth embodiment of a machine tool according to the present invention.

FIG. 35 is a block diagram showing a fourth embodiment of the machine tool of the present invention. A CPU 1d acts as an operation means and a prepared hole depth memory 2d stores the number of threads in tap working and a multiple of a reamer diameter in reamer working and corresponds to a setting means for setting a difference in working depth between first and second working operations. A keyboard 3d comprises an input unit, a ROM 4d is provided for storing instructions for controlling the CPU 1d to cause it to perform various operations, for example, determination of the working depth. A working program memory 5d stores a working program edited in accordance with the kind and shape of final working illustrated in a planning drawing.

A working pattern memory 6d stores a working pattern for a preworking step corresponding to the preworking step, a tap prepared hole memory 7d stores a tap prepared hole diameter that is registered as a second kind of information for a preworking step, and a working parameter memory 8d stores a reamer mounting margin, that is registered as a third kind of information of the preworking step. There is further provided a tool information memory 9d for storing information with respect to the tools to be used for working operations. The CPU 1d is connected to a ROM 10d that stores control information relating to the number of revolutions of a main spindle, head feeding, X-Y feeding, exchange of tools, and the like.

The number of threads of the tap and the multiple of the diameter of the reamer, which are stored contents of the prepared hole memory 2d, are desirably set by a worker. For example, in the case of the tap forming with nominal designation M6, the number of threads is set to be 3 to 5, while, for example, in the case of reamer working, the multiple of the diameter is set to be 1 to 2.

The editing of the working program in the working program memory 5d is performed by operating a keyboard 3d, as shown in FIG. 35, to enter drawing data such as tool diameters (hole diameters) or the like, to select the working order, to change tool patterns, to assign and change tools, to change cutting conditions, to display, delete, and align used and vacant amounts of program memory, and to input and output data with respect to an external program storage device, etc.

The stored contents of the tool information memory 9d contain, for example, a tool name, required dimensions, a tool length, and residual using time (minute), for each of the tool numbers 01 to 07 as shown in a tool table of FIG. 36. Specifications for about sixty tools can be registered in the tool information memory 9d. The dimensions required at the time of registration of various tools, such as a drill, a center drill, a chamfering tool, a tap, a countersunk drill, etc., in the tool table of FIG. 36 may include, as written in FIG. 36 with respect to the various tools, a point angle $\alpha$, a drill diameter $\phi D$, and a flute length l in the case of a drill; a small diameter $\phi d$ and a small diameter portion length $l_1$ in the case of a countersunk drill; and a center angle $\theta$ in addition to the required dimensions as described above in the case of a center drill. As to a tap, a chamfer length L, a diameter, a nominal designation, a pitch, the number of threads, a flute length, and the direction of the thread may be the dimensions required at the time of tool registration. For a chamfering tool, a small diameter $\phi d$, a center angle $\theta$, and a diameter $\phi D$ may be the dimensions required at the time of tool registration. Further, for a reamer, chamfer length L, a diameter $\phi D$, a flute length l, etc., may be required.

The positions of these dimensions required at the time of tool registration are illustrated in FIGS. 4(a) to 4(f) for the respective tools, that is, the center drill, the drill, the tap, the chamfering tool, the countersunk drill, and the reamer, respectively.

The stored contents of the working pattern memory 6d include a first kind of information in connection with the preworking step, tool patterns necessary for various kinds of working operations (final working), such as center hole working, bore working, tap working, countersunk-bore working, reamer working, and countersunk reamer working, are registered for each of the cases of "requiring chamfering" and "without requiring chamfering," as shown in a tool pattern table of FIG. 5. The stored contents of the tap prepared hole memory 7d include a second kind of information in connection with the preworking operations, for example, as to a coarse screw thread. Prepared hole drill diameters are stored in accordance with the nominal designation and the pitch in the final working step may be stored in a table as shown in a table of tap prepared hole drill diameters of FIG. 6.

The stored contents of the working parameter memory 8d include the reamer mounting margin and other information necessary for the preworking steps, the reamer mounting margin being desiredly set by a worker, for example, within a range of 0.05 to 0.5 mm.

Next, the operation of the fourth embodiment of the machine tool of the present invention will be described.

In order to machine a workpiece by using the machine tool of the fourth embodiment, a working initiation step 103 is performed after the step 101 of entering a working program and a step 102 of executing tool assignment as shown in the flowchart of FIG. 10.

Figure 37A:
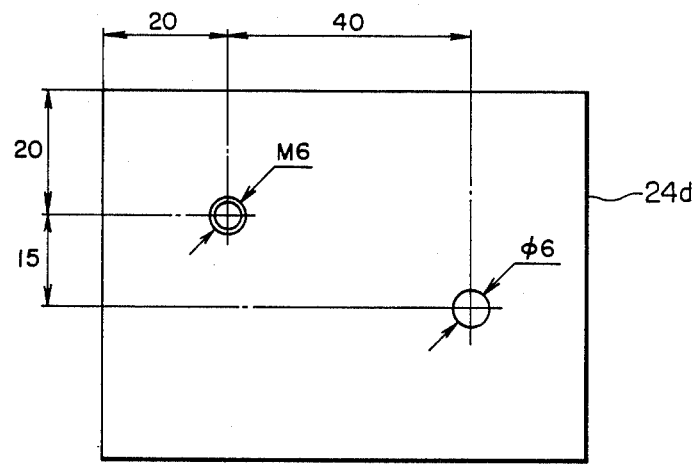
FIGS. 37a and 37b are a plan and a cross-section views of a workpiece following the completion of second working (final working) described with respect to the embodiment of FIG. 35.
Figure 37B:
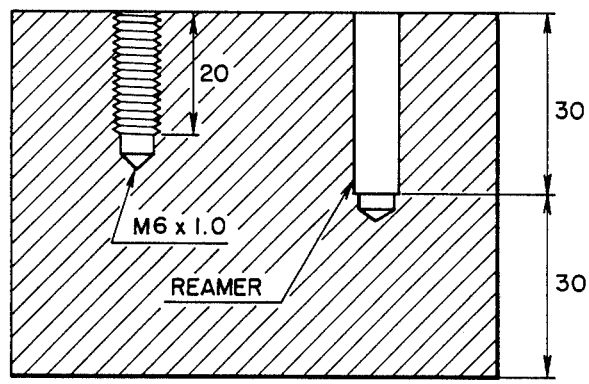

Final working operations performed by the tool of the fourth embodiment are shown in FIG. 37. Tap working with the nominal designation M6 and the pitch 1 and reamer working with the hole diameter of 6 mm are performed on a workpiece 24d at illustrated dimensional positions. The working program of the fourth embodiment is such that, as shown in a working program table of FIG. 38, in step number 01, tap working is performed in accordance with illustrated components and in step number 02 reamer working is performed in accordance with illustrated components.

Entry of the working program of FIG. 38 is performed in the same manner as described above with reference to the computer screens 19 shown in FIGS. 16 to 22. That is, a working program for tap working in the first step can be entered in response to the inquiries on the screen 19 by entering the menu number "1", the program number "1000", the working origin "X=100,Y=100", the number of the workpiece "1", the quality of workpiece material "S45C", the step number "01", the working manner "tap working", the kind of screw "metric coarse screw thread", the nominal designation "M6", the pitch "1", chamfering "required", the Z-axis end "blind hole", the working depth "20" mm, the workpiece height "80" mm, the return height "85" mm, and XY coordinates "X=20" and "Y=20".

In the same manner as the first step, in the case of the second step, the step number "02", the working manner "reamer working", the hole diameter "6" mm, the chamfering "not-required", the Z-axis end "blind hole", the working depth "30" mm, the workpiece height "80" mm, the return height "85" mm, and the XY coordinates "X=60" mm, and "Y=35" mm can be entered in accordance with the working program table of FIG. 38. Thus, the working program reaches an END.

Figure 39:
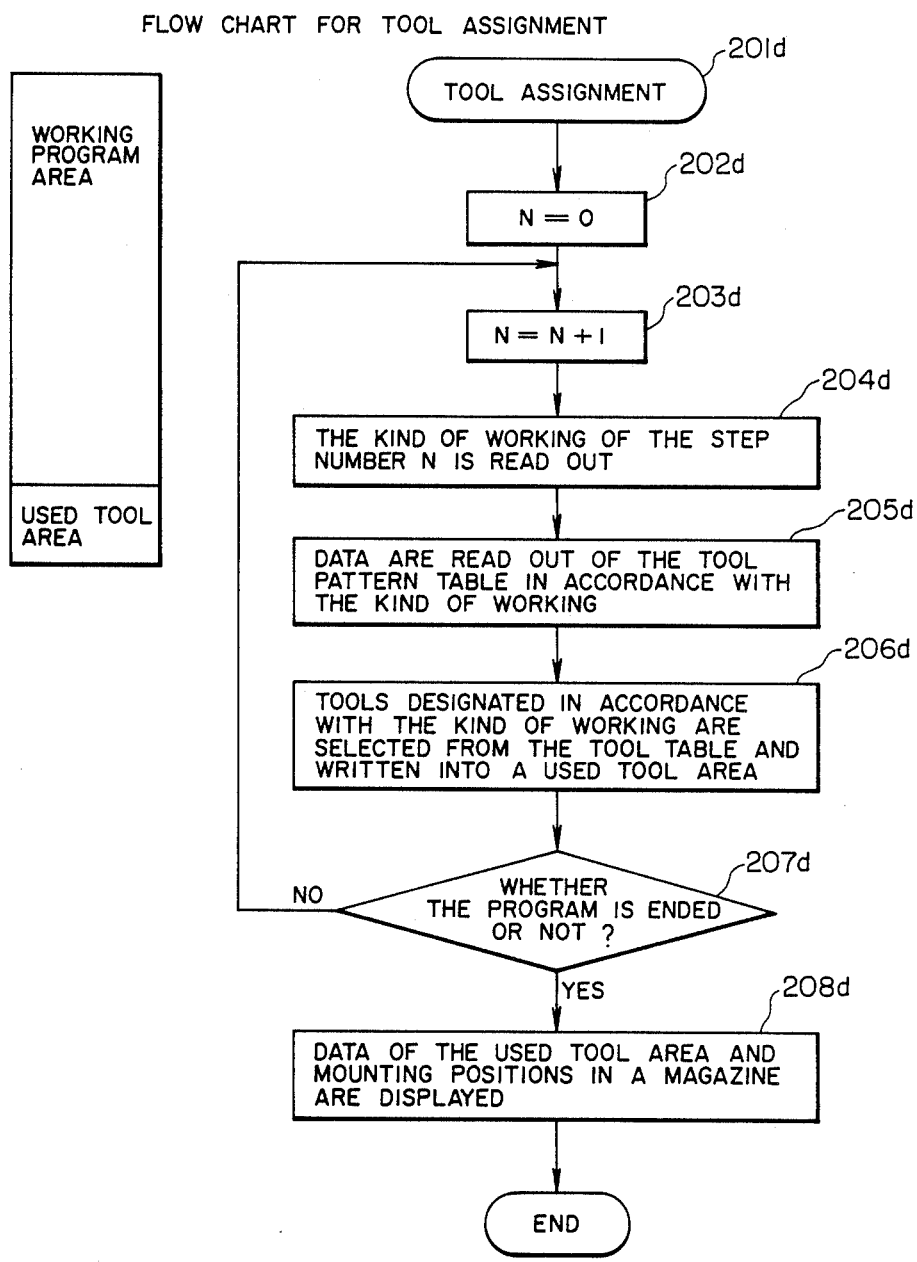
FIG. 39 is a flowchart showing the steps to be performed in the execution of tool assignments.

Next, step 102, "execution of the tool assignment", as shown in FIG. 10, is performed. FIG. 39 shows a flowchart for performing step 102 which is substantially the same as that of FIG. 11 relating to the first embodiment.

In the flowchart of FIG. 39, a test is made as to whether the tool arrangement program is ended (branching command 207$d$) and if NO, the operation is returned to a command 203$d$. The commands 203$d$ to 206$d$ are executed again, that is, in the case of reamer working (not-requiring chamfering) of the second working step in the fourth embodiment, "1:center drill" and "2:drill reamer" are read out of the tool pattern table of FIG. 5 as preworking data the data of the reamer mounting margin 8 are retrieved from the working parameter memory 8$d$ tools having an applicable tool name are selected from the tool table of FIG. 3 and the tools designated in accordance with the kind of working operations from a working program area are written into a used tool area as the tool information by using the tool numbers. Thereafter, a test is made as to whether the program is to be ended (branching command 207$d$), and if YES, the data corresponding to the used tool area and mounting positions in a magazine 14 are displayed on the screen 19 in response to a command 208$d$. The tool assignment program is then ended (END).

After the execution of the tool assignment program the tools necessary for execution of the working program are displayed with the magazine numbers from 1 to 10 to show the proper mounting position in the magazine 14. The display is in an instruction data display area at a lower portion of the screen 19 in the order of use as shown in FIG. 40. In the case where a program display area at an upper portion of the screen 19 is blank, as shown in FIG. 40, the operator understands to mount the tools to be used in the magazine 14 in accordance with the magazine number designated in the instruction data display area. At the same time, entry is made of the magazine number for each tool in the keyboard 62 and the setting key 63. That is, "1" and "setting", "2" and "setting", "3" and "setting" . . . are successively entered, so that the tool mounting positions are stored in a magazine mounting position memory. Prior to such entry, the cursor 19$a$ is set on the magazine number by the up/down displacement key 64.

In the case where tools which have been used in a preceding working program are displayed, modification is partly performed to make it possible to utilize the tools which have been previously used. In order to change the tool for the purpose of the modification, a new tool number is entered into the magazine number corresponding to the old tool. In the case where an old tool is merely dismounted for the purpose of the modification, the cursor 19$a$ is set on the magazine number corresponding to the old tool and the deletion key 5 is pushed. The tool mounting position corresponding to the magazine number becomes blank in the magazine 14. In this case, the insertion key 66 is disregarded. When step 102 for executing the tool assignment is ended in the manner as described above, it is possible to execute the working initiation step 103.

The initiation of execution of the working program is performed on the basis of the flowchart of FIG. 12 in the same manner as with regard to the first embodiment.

Figure 41:
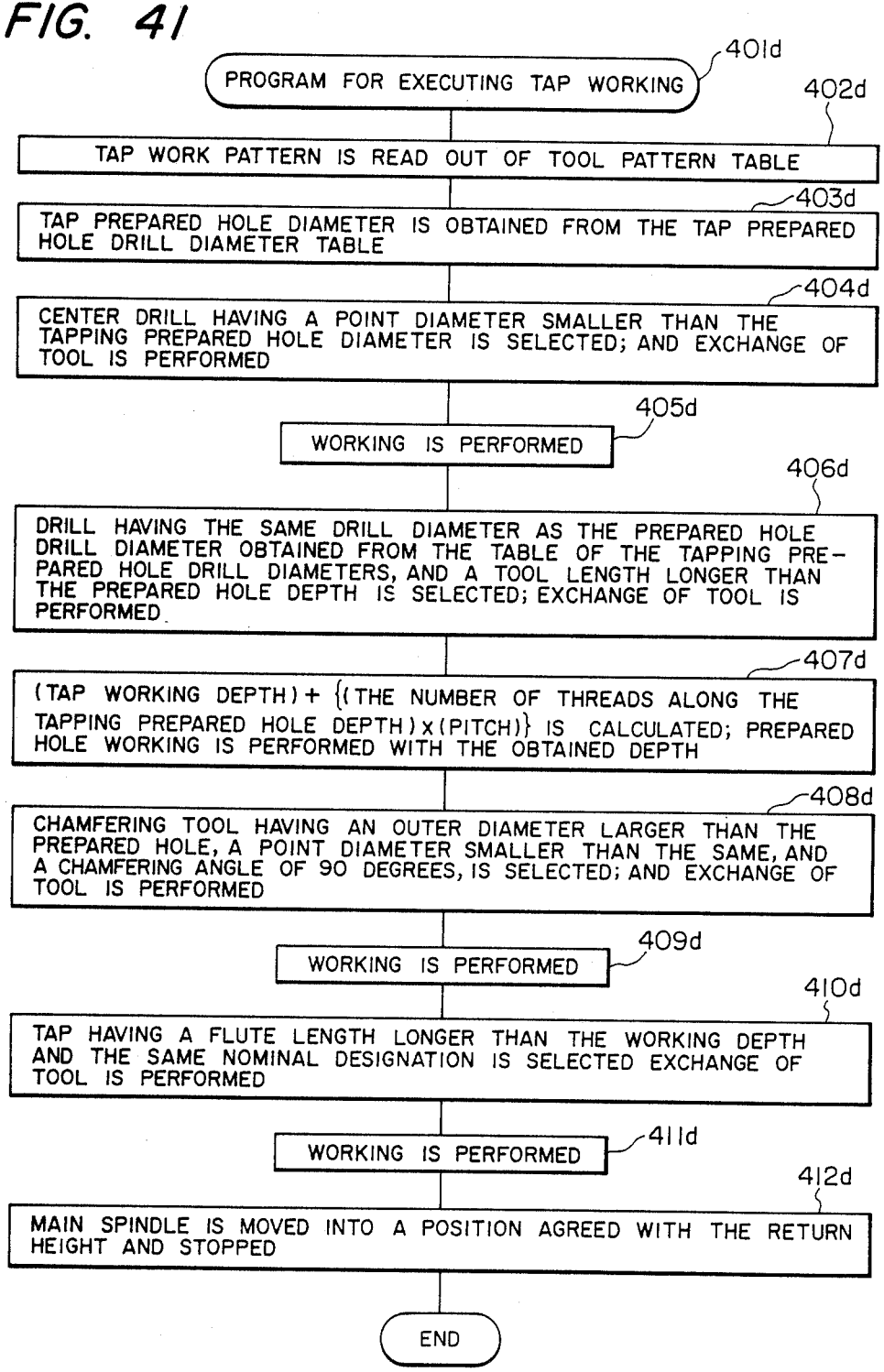
FIG. 41 is a flowchart showing the execution of tap working.

Further, an example of the execution of tap working will be described with reference to the flowchart of FIG. 41. The flowchart of FIG. 41 is substantially the same as that of FIG. 13 in the first embodiment. That is, commands 401$d$ to 403$d$ in FIG. 41 are the same as commands 401 to 403. In response to a command 404$d$, it is determined that the tool number of a center drill having a diameter smaller than the tap prepared hole drill diameter (5.0 mm) is "03" from the tool table of FIG. 36 showing tool information. The center drill is selected and a tool exchange is instructed. In response to a command 406$d$, center hole working is performed in a predetermined position indicated in accordance with the preworking program. A drill (with tool number 02) having a drill diameter which is the same as the tap prepared hole drill diameter (5 mm) obtained from the table of the tap prepared hole drill diameters of FIG. 6 and a tool length longer than the prepared hole depth (30 mm) is selected from the tool table of FIG. 36 and tool exchange is instructed. In response to a command 407$d$, the prepared hole depth is obtained by the following expression (1) and prepared hole formation is performed with the obtained depth.

(tap working depth) + (1)

(the number of threads along the tapping prepared hole depth) ×

(pitch)

In response to a command 408$d$, a chamfering tool (with tool number 04) having a first diameter larger than the tap prepared hole drill diameter (5 mm), a second diameter smaller than the same (5 mm), and a chamfering angle of 90 degrees is selected from the tool table of FIG. 36 and a tool exchange is instructed. Chamfering working is performed in response to a command 409$d$.

Next, in response to a command 410$d$, a tap (with tool number 05) having a flute length longer than the working depth (25 mm) and with a nominal designation (M6) is selected from the tool table of FIG. 36 and a tool exchange is instructed. Tap working operations are performed in response to a command 411$d$, and in response to a command 412$d$, the main spindle is moved to a position corresponding to the return height (45 mm) and stopped. As described above, the execution of the tap working operations entered as the first step of the working program ends (END). Execution of reamer working entered as the second step of the working program, is performed in accordance with a flowchart of FIG. 42 in the same manner as for the tap working operations.

Thus, in the fourth embodiment, the programming by a machine user is also greatly simplified because the editing of the working program can be performed by the machine user by successively entering the final working step and the associated dimensions in response to the queries on the CRT screen. Further, no NC language is required in entering the final working step, etc., to also make the programming easier.

The order and selection of tools for working operations can be entered as data in the tool information memory, the working pattern memory for storing the preworking step, the tap prepared hole memory, and the working parameter memory in the machine separately from the final working step and the associated dimensions. Further, according to the present invention, in the case of tap working operations, the number of threads is entered in the prepared hole depth memory, and, therefore, the prepared hole depth is automatically changed depending on the number of threads. That is, a tap of large pitch has a large diameter and the prepared hole is made deeper by a value of a product between the number of threads and the pitch. This results in the advantage that it is unnecessary for the worker to change the prepared hole depth in the working program in accordance with differences in pitch of the tap. Further, in the case of reamer working, since a multiple of the reamer diameter is entered in the prepared hole depth memory, the prepared hole depth is automatically changed in accordance with the reamer diameter. Therefore, in the same manner as the tap working operations, there is such an advantage that it is unnecessary to enter the prepared hole depth in accordance with a difference in diameter of the reamer in making a working program.

Although only the tap working operations and the reamer working operation have been described with reference to the fourth embodiment, in the instances of working operations in which it is necessary to perform the prepared hole working steps as the first working operation and to perform as the second working operations, for example, countersunk tap working, countersunk reamer working, or the like, each of the first and second working operations can be easily executed by entering each working program in the machine tool according to the present invention in the same manner as for tap and reamer working.

As described above, in the machine tool according to the present invention, preworking operations corresponding to final working operation can be determined by merely entering the kind and final shape of the workpiece illustrated in a planning drawing. Therefore, there is such a remarkable effect that it is easy to program a working program. Further, since the machine tool according to the present invention has means for storing cutting conditions for every kind of working operation for every quality of workpiece material, there is also a superior effect that the cutting conditions are easily stored in advance. Moreover, since it is possible to store the working program in another storage means separately from the cutting conditions, it is unnecessary to enter the cutting conditions for every step of the working program. Therefore, programming may be easily performed.

Further, in the machine tool according to the present invention, since tools to be used in a working program are automatically selected and indications thereof displayed only by entering the position and shape in the working program, there is a superior effect in that the tools can be easily mounted in the tool magazine. Working programming is simplified because it may be performed without considering any tool mounting positions.

Moreover, the machine tool according to the present invention has a remarkable effect that it is not necessary to enter the prepared hole depth every time when the working program is made because in the first working operations corresponding to the second working operations, the prepared hole depth is automatically determined.

What is claimed is:

1. A machine tool having a plurality of tools for successively performing on a workpiece working steps corresponding to a plurality of types of working operations, comprising:
    tool information memory means for storing information relating to each of the plurality of tools;
    working program memory means for storing a working program including working operation control information for each working step of the plurality of types of working operations;
    preworking step memory means for storing a preworking step corresponding to each of the working steps of the working operations; and
    operation means for accessing the tool information memory means, the working program memory means, and the preworking step memory means for executing said working program to select said preworking step corresponding to each of the working steps of the working operations, and for determining the tools necessary to perform each of the working steps and said corresponding preworking steps.

2. A machine tool according to claim 1, wherein said operation means comprises a programmed central processing unit and said working program memory means, said preworking step memory means and said tool information memory means comprise random access memories.

3. A machine tool according to claim 2, further including display means controlled by said central processing unit for displaying an indication of each of the tools determined to be necessary for performance of the working steps and said corresponding preworking steps.

4. A machine tool having a plurality of tools for successively performing on a workpiece working steps corresponding to a plurality of types of working operations, comprising:
    first storage means for storing cutting data associated with a plurality of types of workpiece material, said cutting data for use by the machine tool in performing the working operation on workpieces being made from said types of workpiece materials;
    second storage means for storing a working program including operation control data associated with each of said types of workpiece material and with a plurality of different types of working operations; and
    working control means for selectively accessing data for workpiece material and the working operation from said first storage means said second storage means and for controlling the machine tool to perform the working operation on the workpiece in accordance with the cutting data and the operation control data selected from said first storage means and said second storage means, respectively.

5. A machine tool according to claim 4, wherein said working control means comprises a computer having means for entering the type of workpiece and the type of material thereof for a workpiece to have a working operation performed thereon by the machine tool.

6. A machine tool having a plurality of tools for successively performing on a workpiece working steps corresponding to a plurality of types of working operations comprising:
   first storage means for storing data corresponding to the kinds and shapes of the tools useable by the machine tool;
   second storage means for storing a working program including operation control data associated with the shape and type of material of each of a plurality of workpieces, said control data including a sequence of the working steps necessary to perform a selected working operation on a workpiece of a particular shape and material; and
   operation means for accessing said first storage means and said second storage means and for selecting, for a particular workpiece to have the working operations performed thereon by the machine tool, the tools and sequence of use thereof necessary to perform the working operations on said particular workpiece, said tool selection being performed in response to the operation control data associated with said particular workpiece.

7. A machine tool according to claim 6, wherein said first storage means also stores preworking steps to be performed in accordance with the type of material and shape of a workpiece, said operation means for accessing the preworking steps associated with said particular workpiece and for controlling the machine tool to perform said accessed preworking steps.

8. A machine tool having a plurality of tools for successively performing on a selected workpiece working operations comprising:
   working program memory means for storing a working program including control information for each of the working operations, the control information including first control data associated with a first working step for boring a hole in the selected workpiece and a second working step associated with said first working step for tapping or reaming said hole to be bored as a result of said first working step;
   means for setting a difference in the depth of boring in said first working step and tapping or reaming in said second working step; and
   operation means for accessing said working program memory means and for viewing said difference set by said setting means, said operation means executing said working program to control said machine tool with said control information such that said first working step is performed to bore a hole with a first depth in the workpiece and said second working step is performed to tap or ream said hole to a second depth shorter than said first depth by said difference.

9. A machine tool according to claim 8, wherein said setting means includes means for entering a multiple value of a diameter of a tool and wherein said operation means includes means for generating a product value corresponding to the product of said multiple value and the diameter of a tool for performing said second working step, said operation means controlling the machine tool such that the depth of the hole formed in the selected workpiece during the first working steps exceeds the depth of said tapping or reaming in said second working step by said product value.

10. A machine tool according to claim 8, wherein said setting means includes means for entering the number of threads to be made during said tapping in second working step and the pitch of said threads and wherein said operation means includes means for generating a product value corresponding to the product of the number of said threads and the pitch of said threads, said operation means controlling the machine tool such that the depth of the hole formed in the selected workpiece during the first working step exceeds the depth of said tapping or reaming in said second working step by said product value.

11. A machine tool having a plurality of tools for successively performing on a workpiece working steps corresponding to a plurality of types of working operations comprising:
   first storage means for storing data corresponding to the kinds and shapes of the tools useable by the machine tool;
   second storage means for storing a working program including operation control data associated with the shape and type of material of each of a plurality of workpieces, said control data including a sequence of the working steps necessary to perform a selected working operation on a workpiece of a particular shape and material;
   operation means for accessing said first storage means and said second storage means and for selecting, for a particular workpiece to have the working operations performed thereon by the machine tool, the tools and sequence of use thereof necessary to perform the working operations on said particular workpiece, said tool selection being performed in response to the operation control data associated with said particular workpiece; and
   display means controlled by said operation means for displaying an indication of each of the tools determined to be necessary for performance of the working steps and said corresponding preworking steps.

12. A machine tool according to claim 1, wherein said operation means comprises means for accessing the tool information memory means, the working program memory means, and the preworking step memory means during working for executing said working program to select said preworking step corresponding to each of the working steps of the working operations, and for determining the tools necessary to perform each of the working steps and said corresponding preworking steps.

13. A method for operating a machine tool having a plurality of tools for successively performing on a workpiece working steps corresponding to a plurality of types of working operations comprising the steps of:
   storing information relating to each of the plurality of tools in a tool information memory means;
   storing a working program including owrking operation control information for each of the working steps of the plurality of types of working operation in a working program memory means;
   storing a preworking step corresponding to each of the working steps of the working operations in a preworking step memory means;
   providing an operation means for accessing the tool information memory means, the working program memory means and the preworking step memory means and for executing the working program accessed in said working program memory means, said execution comprising the steps of:

selecting the preworking steps corresponding to each of the working operations in response to data stored in the preworking step memory means and the working program memory; and selecting the tools necessary to perform each of the working steps and said corresponding preworking steps in response to the working and the preworking steps and the information stored in the tool information memory means.

14. A method of operating a machine tool according to claim 13, wherein said operation means performs said accessing and executing steps during the working operations.

15. A method of operating a machine tool according to claim 13, including the further step of displaying an indication of each of the tools determined to be necessary for performance of the working steps and said corresponding preworking steps by means controlled by said operating means.

* * * * *